United States Patent
Bocharov et al.

(10) Patent No.: US 11,797,872 B2
(45) Date of Patent: Oct. 24, 2023

(54) QUANTUM BIT PREDICTION

(71) Applicant: Microsoft Technology Licensing, LLC, Redmond, WA (US)

(72) Inventors: Alexei V. Bocharov, Redmond, WA (US); Eshan Kemp, Bellevue, WA (US); Michael Hartley Freedman, Santa Barbara, CA (US); Martin Roetteler, Woodinville, WA (US); Krysta Marie Svore, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1032 days.

(21) Appl. No.: 16/577,215

(22) Filed: Sep. 20, 2019

(65) Prior Publication Data

US 2021/0089953 A1 Mar. 25, 2021

(51) Int. Cl.
*G06N 10/00* (2022.01)
*G06N 20/00* (2019.01)
*G05B 19/045* (2006.01)
*G06N 10/20* (2022.01)

(52) U.S. Cl.
CPC ........... *G06N 10/00* (2019.01); *G05B 19/045* (2013.01); *G06N 10/20* (2022.01); *G06N 20/00* (2019.01)

(58) Field of Classification Search
CPC ........ G06N 10/00; G06N 10/20; G06N 20/00; G05B 19/045
See application file for complete search history.

(56) References Cited

U.S. PATENT DOCUMENTS

| | | | |
|---|---|---|---|
| 7,451,344 B1* | 11/2008 | Rothberg | G11B 20/182 714/6.1 |
| 9,100,735 B1* | 8/2015 | Taenzer | G10L 15/20 |
| 9,253,566 B1* | 2/2016 | Taenzer | H04R 3/005 |
| 9,514,415 B2* | 12/2016 | Bocharov | B82Y 10/00 |
| 2007/0047811 A1* | 3/2007 | Itoh | G06T 7/254 382/173 |
| 2014/0280427 A1* | 9/2014 | Bocharov | B82Y 10/00 708/200 |
| 2017/0169346 A1* | 6/2017 | Rinkus | G06N 3/049 |
| 2017/0220948 A1* | 8/2017 | Bocharov | G06F 30/00 |
| 2019/0114557 A1 | 4/2019 | Ashrafi | |
| 2020/0074316 A1* | 3/2020 | Ma | G06F 16/9024 |
| 2020/0210162 A1* | 7/2020 | Howard | G06F 16/24558 |
| 2020/0327441 A1* | 10/2020 | Cao | G06N 10/00 |

OTHER PUBLICATIONS

Circuit-centric quantum classifiers Schuld et al. (Year: 2018).*
Quantum circuit structure learning Ostaszewski et al. (Year: 2019).*

(Continued)

*Primary Examiner* — Brian M Smith
*Assistant Examiner* — Ababacar Seck
(74) *Attorney, Agent, or Firm* — Holzer Patel Drennan

(57) ABSTRACT

A quantum prediction AI system includes a quantum prediction circuit adapted to receive an input vector representing a subset of a time-sequential sequence; encode the input vector as a corresponding qubit register; apply a trained quantum circuit to the qubit register; and measure one or more qubits output from the quantum prediction circuit to infer a next data point in the series following the subset represented by the input vector.

20 Claims, 12 Drawing Sheets

(56) References Cited

OTHER PUBLICATIONS

A Resource-Optimal Canonical Form for Single-qubit Quantum Circuits Bocharov et al. (Year: 2012).*
Killoranet al.Continuous-variable quantum neural networks Killoran et al. (Year: 2018).*
Unification of Recurrent Neural Network Architectures and Quantum Inspired Stable Design Anonymous authors (Year: 2019).*
Bidirectional Recurrent Neural Networks Schuster et al. (Year: 1997).*
Real-Time Gesture Recognition by Means of Hybrid Recognizers Andrea Corradini (Year: 2002).*
Deep ART Neural Model for Biologically Inspired Episodic Memory and Its Application to Task Performance of Robots Park et al. (Year: 2018).*
Machine Learning Cryptanalysis of a Quantum Random Number Generator Truong et al. (Year: 2019).*
Spatially distributed successive approximation register (SDSAR) photonic ADCs based on phase-domain quantization Nazarathy et al. (Year: 2012).*
Analyzing a class of pseudo-random bit generator through inductive machine learning paradigm Kant et al. (Year: 2006).*
Aharonov, et al., "A Polynomial Quantum Algorithm for Approximating the Jones Polynomial", In Proceedings of the Thirty-Eighth Annual ACM Symposium on Theory of Computing, May 21, 2006, pp. 427-436.
Bocharov, et al., "Predicting Human-Generated Bitstreams using Classical and Quantum Models", In Journal of Computing Research Repository, Apr. 9, 2020, 10 Pages.
Ostaszewski, et al., "Quantum Circuit Structure Learning", In Repository of arXiv:1905.09692, May 23, 2019, 9 Pages.
"International Search Report and the Written Opinion Issued in PCT Application No. PCT/US2020/036831", dated Sep. 22, 2020, 38 Pages.
"Neural Network Models (supervised), Classification", Retrieved From: https://scikit-learn.org/stable/modules/neural_networks_supervised.html#classification, 2019, 5 Pages.
Aerts, et al., "From Quantum Axiomatics to Quantum Conceptuality", In repository of arXiv, arXiv:1805.12122, May 29, 2018, 11 Pages.
Aerts, et al., "Modeling Human Decision-making: An Overview of the Brussels Quantum Approach", In repository of arXiv, arXiv:1807.11036, Jul. 29, 2018, 25 Pages.
Aerts, et al., "Quantum Structure in Cognition and the Foundations of Human Reasoning", In Proceedings of International Journal of Theoretical Physics, vol. 54, Issue 12, Jun. 20, 2015, 14 Pages.
Barenco, et al., "Elementary Gates for Quantum Computation", In Journal of Physical review A vol. 52, Issue 5, Nov. 1, 1995, pp. 3457-3467.
Bergholm, et al., "PennyLane: Automatic Differentiation of Hybrid Quantum-Classical Computations", In repository of arXiv, arXiv:1811.04968, Nov. 12, 2018, 12 Pages.
Deng, et al., "Quantum Entanglement in Neural Network States", In Journal of Physical Review X vol. 7, Issue 2, May 11, 2017, 17 Pages.
Farhi, et al., "Classification with Quantum Neural Networks on Near Term Processors", In repository of arXiv, arXiv:1802.06002, Feb. 16, 2018, 21 Pages.
Guerreschi, et al., "Practical Optimization for Hybrid Quantum-Classical Algorithms", In repository of arXiv, arXiv:1701.01450, Jan. 5, 2017, 25 Pages.
Halpern, "Quantum Information in Quantum Cognition", In repository of arXiv, arXiv:1711.04801, Nov. 13, 2017, 42 Pages.
Lecun, et al., "The MNIST Database of Handwritten Digits", Retrieved From: http://yann.lecun.com/exdb/mnist/, Jun. 22, 2002, 7 Pages.
Levine, et al., "Deep Learning and Quantum Entanglement: Fundamental Connections with Implications to Network Design", In repository of arXiv, arXiv:1704.01552, Apr. 10, 2017, 46 Pages.
Merrill, Nick, "Aaronson-oracle", Retrieved From: http://people.ischool.berkeley.edu/~nick/aaronson-oracle/, Mar. 27, 2016, 2 Pages.
Mitarai, et al., "Quantum Circuit Learning", In Journal of Physical Review A, vol. 98, Issue 3, Sep. 10, 2018, 7 Pages.
Nielsen, et al., "Quantum Computation and Quantum Information", Published by Cambridge University Press, Dec. 9, 2010, 704 Pages.
Plesch, et al., "Quantum-state Preparation with Universal Gate Decompositions", In Journal of the Physical Review A, vol. 83, Issue 3, Mar. 3, 2011, 5 Pages.
Preskill, John, "Quantum Computing in the NISQ Era and Beyond", In Journal of Quantum, vol. 2, Aug. 6, 2018, pp. 1-20.
Romero, et al., "Quantum Autoencoders for Efficient Compression of Quantum Data", In Journal of Quantum Science and Technology, vol. 2, Issue 4, Aug. 18, 2017, 10 Pages.
Schuld, et al., "Circuit-centric Quantum Classifiers", In repository of arXiv, arXiv:1804.00633, Apr. 2, 2018, 17 Pages.
Schuld, et al., "Evaluating Analytic Gradients on Quantum Hardware", In repository of arXiv, arXiv:1811.11184, Nov. 27, 2018, 8 Pages.
Schuld, et al., "Quantum Machine Learning in Feature Hilbert Spaces", In Journal of Physical Review Letters, vol. 122, Issue 4, Feb. 1, 2019, 12 Pages.
Stoudenmire, et al., "Supervised Learning with Tensor Networks", In Proceedings of the 30th Conference on Neural Information Processing Systems, Dec. 5, 2016, 9 Pages.
Verdon, et al., "A Quantum Algorithm to Train Neural Networks Using Low-Depth Circuits", In repository of arXiv, arXiv:1712.05304, Dec. 14, 2017, 8 Pages.
Wecker, et al., "LIQUi|>: A Software Design Architecture and Domain-Specific Language for Quantum Computing", In repository of arXiv, arXiv:1402.4467, Feb. 18, 2014, 14 Pages.

* cited by examiner

QUANTUM BIT PREDICTION

BACKGROUND

Machine learning is one candidate application for near-term quantum computing. Machine learning is data-driven decision making in which a computer fits a mathematical model to data (training) and uses the model to derive decisions (inference). A prominent strategy is to encode data into the amplitudes of a quantum state (also referred to as "amplitude encoding"), and use quantum circuits to manipulate these amplitudes. Most of the existing literature on amplitude encoded machine learning translates known machine learning models into non-trivial quantum subroutines that lead to resource intensive algorithms which cannot be implemented on small-scale devices.

SUMMARY

According to one implementation, a quantum AI prediction circuit is adapted to receive an input vector representing a subset of a time-sequential sequence; encode the input vector as a corresponding qubit register; apply a trained quantum circuit to the qubit register; and measure one or more qubits output from the quantum prediction circuit to infer a next data point in the series following the subset represented by the input vector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The herein disclosed artificial intelligence (AI) quantum prediction methodology leverages advantages of amplitude encoding while also being based on a variational approach designed for quantum devices with less processing power. According to one implementation, an AI quantum predictor is trained via a supervised learning technique to use pattern recognition to predict a "next" data point in a time-sequential sequence of points, even in cases where the point does not yet exist in the real world. The time-sequential data sequence may be any sequence of data points collected in a time-sequential manner including, for example, data points representing weather patterns (e.g., temperature trends), economics data, human decision making, etc.

According to one implementation, the herein disclosed AI prediction technology leverages the processing power of quantum machines to intelligently predict future data bits in human-generated time-based data sequences. If, for example, a human is asked to randomly input a sequence of 1s and 0s to a computer program the sequence will, by nature, incorporate non-random patterns that the user subconsciously selects. The disclosed technology can be similarly employed to predict data points for any time-sequential sequence that is not human-generated.

Figure 1:
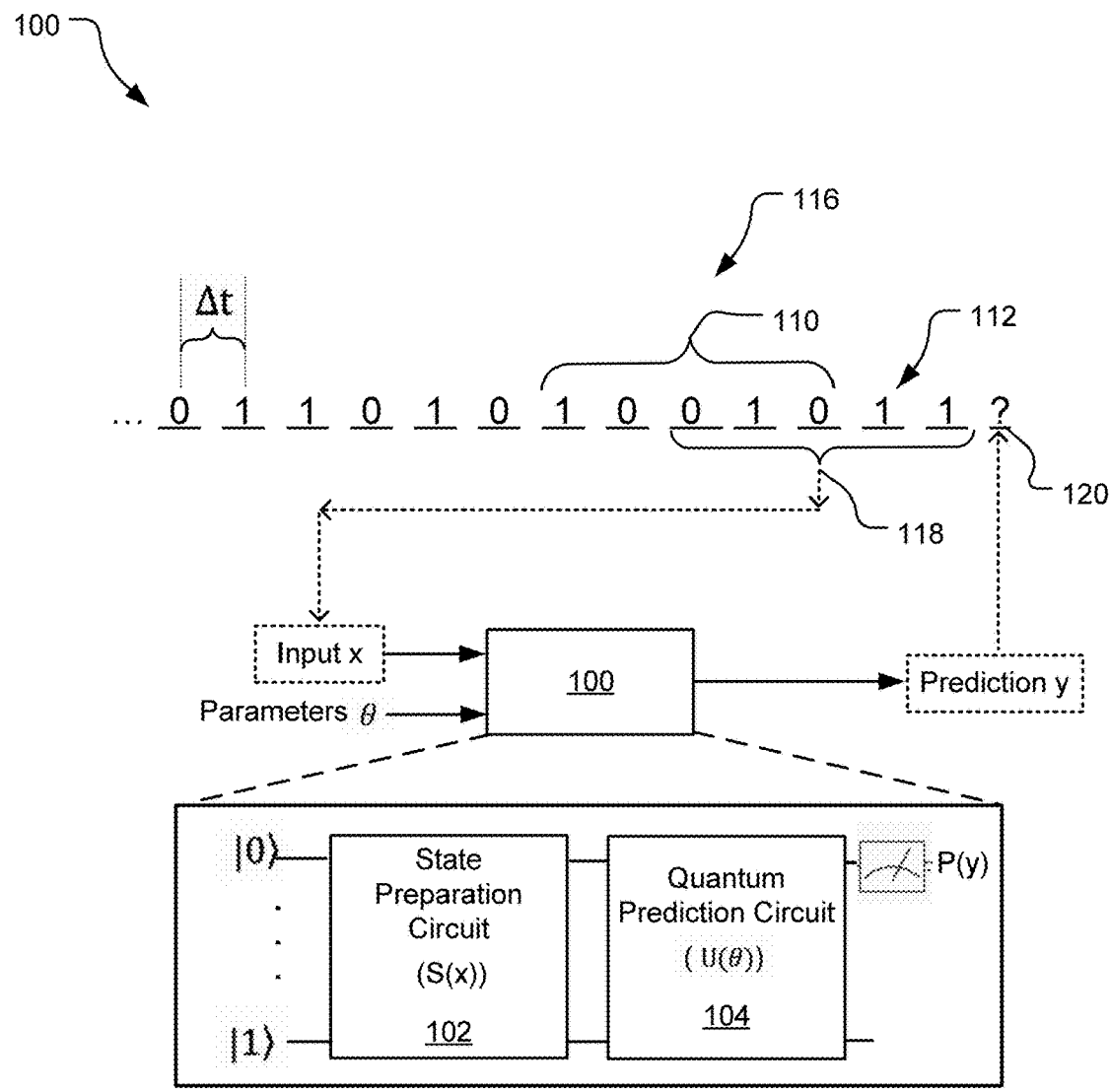
FIG. 1 illustrates an example quantum AI system including an example state preparation circuit and a quantum prediction circuit.

FIG. 1 illustrates an example quantum AI system 100 including an example state preparation circuit 102 and a quantum prediction circuit 104. The quantum prediction circuit 104 is a unitary circuit that acts to transform a quantum state of an input qubit string (also referred to as a qubit register or input vector) that it receives from the state preparation circuit 102. The state preparation circuit 102 prepares this input qubit string by amplitude encoding a subset 114 of a time-sequential sequence 116 of data bits (e.g., represented as "input x" in FIG. 1). The quantum prediction circuit 104 includes a sequence of quantum gates (not shown) that each apply a discrete state transformation to one or more of qubits in the qubit register.

After applying the state transformations to the qubit register, the quantum prediction circuit performs a measurement of a single qubit in the register and outputs a probability of the model predicting zero or 1 (e.g., a quantum probability of the same outcome with respect to repeated instances of same circuit parameters acting on the same input gates). Through a training process described in detail herein, the quantum prediction circuit 104 is trained using supervised learning to transform the qubit register input to the quantum prediction circuit 104 such that the output measurement is predictive of a "next sequential bit" in the sequence immediately following the bits that are encoded in the input qubit register.

If, for example, the qubit register encodes a subset 110 of the sequence 116 including 6 time-sequential data bits (e.g., the values 0, 0, 1, 0, 1, 1), the quantum prediction circuit 104 may output some significantly probability of '1' as representative of the next sequential bit 112 that is in the sequence 116 of time-sequential data point. Stated differently, the quantum prediction circuit 104 is trained to recognize non-random occurrences (e.g., patterns) within the sequence 116 over several training iterations such that the quantum prediction circuit 104 may, once trained, correctly forecast a future bit 120 in the sequence when provided with an input qubit register corresponding to a subset 118 of the sequence immediately preceding the future bit 120 to be predicted.

According to one implementation, the quantum prediction circuit 104 is a generic strongly entangling quantum circuit that applies a parameterized unitary matrix transformation $U_\theta$ describable by the machine learning model $f(x, \theta)=y$, where x is an input (e.g., an input vector of the form $2^n$ where n represents a number of qubits included in the qubit register in put to the quantum prediction circuit 104). The quantum prediction circuit 104 consists of parameterized single and controlled single qubit gates with learnable (classical) parameters. In different implementations, the number of parameterized gates in the quantum prediction circuit 104 grows polynomially with the number of qubits in the register.

The following "Overview of Quantum Computing" discusses what is meant by quantum gates that may be included within the register. Following this overview, the disclosed AI quantum predictor is discussed in greater detail with respect to FIGS. 4-6.

Overview of Quantum Computing

FIG. 2A-2D illustrate a quantum bit, referred to as a "qubit," which is a fundamental data-storage unit of many quantum-computing systems. The qubit is a quantum-computing analog of a classical digital-computer-system bit. A classical bit is considered to occupy, at any given point in time, one of two possible states corresponding to the binary digits "0" and "1." Of course, the classical bit is a high-level abstraction of a hardware implementation of the classical bit and, at the molecular level, the transistors and other circuit components and wiring that together compose a classical bit have an essentially infinite number of quantum-mechanical states. Nonetheless, the complex quantum-mechanical states of a hardware implementation of a classical bit fall into two discrete and measurable subspaces that, in the aggregate, correspond to two discrete and distinguishable macroscopic states corresponding to binary digits "0" and "1."

By contrast, a qubit is implemented in hardware by tiny, physical components with quantum-mechanical characteristics that are generally contained within macroscopic subsystems. These tiny physical components can have an infinite number of different quantum-mechanical states. When the state of a qubit is physically measured, the measurement produces one of two different basis states $|0\rangle$ and $|1\rangle$. The quantum-mechanical state of a qubit is represented as a state vector that represents a superposition of the two states $|0\rangle$ and $|1\rangle$:

$$|\psi\rangle = \alpha|0\rangle + \beta|1\rangle,$$

where $\alpha$ and $\beta$ are complex numbers and $|\alpha|^2+|\beta|^2=1$. The qubit state vector can be represented in vector notation as:

$$|\psi\rangle = \begin{bmatrix} \alpha \\ \beta \end{bmatrix}.$$

The choice of vector representations of the states $|0\rangle$ and $|1\rangle$ is somewhat arbitrary, but to facilitate mathematical operations, these two vectors are generally chosen to be orthonormal representations of eigenstates of a physical system, and are often assigned the vector representations:

$$|0\rangle = \begin{bmatrix} 1 \\ 0 \end{bmatrix},$$

$$|1\rangle = \begin{bmatrix} 0 \\ 1 \end{bmatrix}.$$

In the Dirac notation, $|\ \rangle$ is referred to as the "ket" notation for vectors of an inner-product vector space. This inner-product vector space has a dual inner-product vector space, the vectors of which are represented by the Dirac bra notation $\langle\ |$. The corresponding dual-inner-product vector space vectors for the above-discussed qubit state vectors are:

$$\langle\psi| = [\alpha^*, \beta^*],$$

$$\langle 0| = [1, 0],$$

$$\langle 1| = [0, 1],$$

where $\alpha^*$ is the complex conjugate of $\alpha$. The magnitude of a qubit state vector is computed as the square root of the inner product of the state vector and its corresponding dual state vector:

$$|\langle\psi\|| = \sqrt{\langle\psi|\psi\rangle},$$
$$= \sqrt{\alpha\alpha^* + \beta\beta^*},$$
$$= 1.$$

Thus, state vectors used to describe qubit states are normalized to have a magnitude of 1, which is indicated by the "normal" syllable of the term "orthonormal." The "ortho" syllable refers to the fact that the state vectors $|0\rangle$ and $|1\rangle$ are chosen to be orthogonal, to simplify various operations, including taking inner products. Note that, by one convention, kets are represented by columns vectors and bras by row vectors. A complex row vector multiplied by a complex column vector, as in the above expression for the square root of the inner product of the state vector $|\psi\rangle$, produces a real number, while a column vector multiplied by a row vector produces a generally complex-valued matrix.

The quantum-mechanical state $|\psi\rangle$ of a qubit is not directly observable by measurement. Instead, physical measurement operations are performed on a qubit to produce a measured state in a computational basis, such as the basis $|0\rangle$ or $|1\rangle$. The measurement operations can be represented as 2×2 matrices $M_0$ and $M_1$:

$$M_0 = |0\rangle\langle 0| = \begin{bmatrix} 1 & 0 \\ 0 & 0 \end{bmatrix},$$

$$M_1 = |1\rangle\langle 1| = \begin{bmatrix} 0 & 0 \\ 0 & 1 \end{bmatrix}.$$

The probability that a measurement of a qubit in state $|\psi\rangle$ will return a state $|0\rangle$ or $|1\rangle$ is obtained by the inner product:

$$p_m = \langle\psi|M_m^\dagger M_m|\psi\rangle,$$

where m is 0 or 1, corresponding to a measurement that produces $|0\rangle$ or $|1\rangle$, respectively. For example, the probability $p_0$ that a measurement of the state of a qubit in state $|\psi\rangle$ produces $|0\rangle$ is obtained as:

$$p_0 = \langle \psi | M_0^\dagger M_0 | \psi \rangle,$$
$$= [\alpha^*, \beta^*]\begin{bmatrix} 1 & 0 \\ 0 & 0 \end{bmatrix}\begin{bmatrix} \alpha \\ \beta \end{bmatrix} = \alpha\alpha^* = |\alpha|^2.$$

By a similar computation:

$$p_1 = |\beta|^2.$$

Thus, the squares of the magnitudes of the coefficients $\alpha$ and $\beta$ in the expression $|\psi\rangle = \alpha|0\rangle + \beta|1\rangle$ correspond to the probabilities that a measurement of a qubit in state $|\psi\rangle$ will produce states $|0\rangle$ and $|1\rangle$, respectively.

Figure 2A:
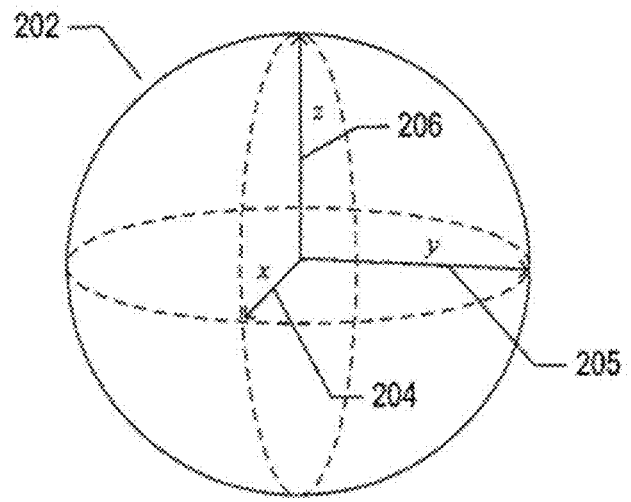
FIGS. 2A-D illustrate a quantum bit, referred to as a "qubit," which is a fundamental data-storage unit of many quantum-computing systems.

FIG. 2A shows a unit sphere 202 centered within a Cartesian coordinate system with orthonormal spatial axes x 204, y 205, and z 206. The surface of this unit sphere represents possible qubit state vectors $|\psi\rangle$ with unit modulus, analogous to the circle of an Argand diagram, discussed below, that represents complex numbers of unit modulus.

Figure 2B:
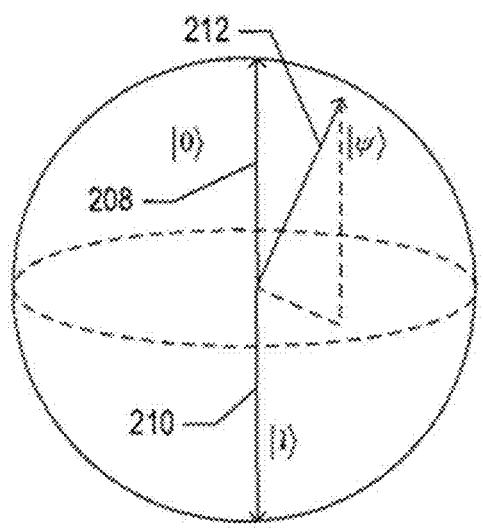

FIG. 2B shows an arbitrary qubit state vector $|\psi\rangle$ within the unit sphere shown in FIG. 2A. The vector of unit magnitude collinear with the positive z axis 208 is arbitrarily chosen to represent state vector $|0\rangle$ and the vector of unit magnitude co-linear with the negative z axis 210 is chosen to represent state vector $|1\rangle$. Pairs of points at which a line passing through the origin intersects the unit sphere correspond to orthogonal state vectors. An arbitrary single-qubit state vector $|\psi\rangle$ 212 is a linear combination of the two computational basis state vectors $|0\rangle$ and $|1\rangle$, as expressed by $|\psi\rangle = \alpha|0\rangle + \beta|1\rangle$, and can thus be any vector that can be inscribed within the unit sphere, with the particular vector corresponding to $|\psi\rangle$ depending on the values of coefficients $\alpha$ and $\beta$. The representation of the state of a qubit shown in FIG. 2B is referred to as a Bloch sphere.

Figure 2C:
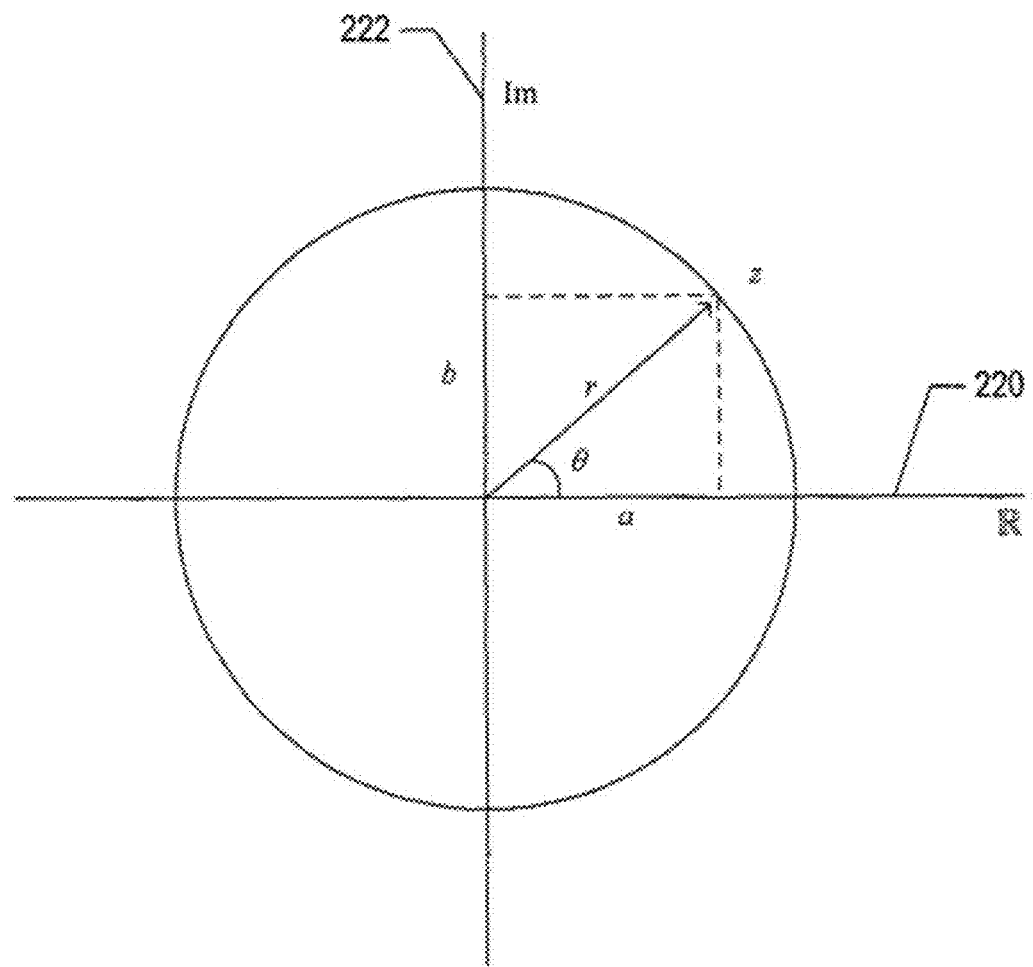

FIG. 2C shows the Argand diagram frequently used to illustrate various ways to represent a complex number. The horizontal axis 220 represents the real numbers and the vertical axis 222 represents the imaginary numbers. The general expression for a complex number z is:

$$z = a + ib,$$

where a and b are real numbers and $i = \sqrt{-1}$. Because $$a = r \cos \theta,$$
$$b = r \sin \theta,$$

as shown in FIG. 2C, the complex number z can be alternatively expressed in polar form as:

$$z = r(\cos\theta + i\sin\theta),$$
$$= re^{i\theta},$$
$$= e^{i\theta} \text{ for } |r| = 1.$$

Figure 2D:
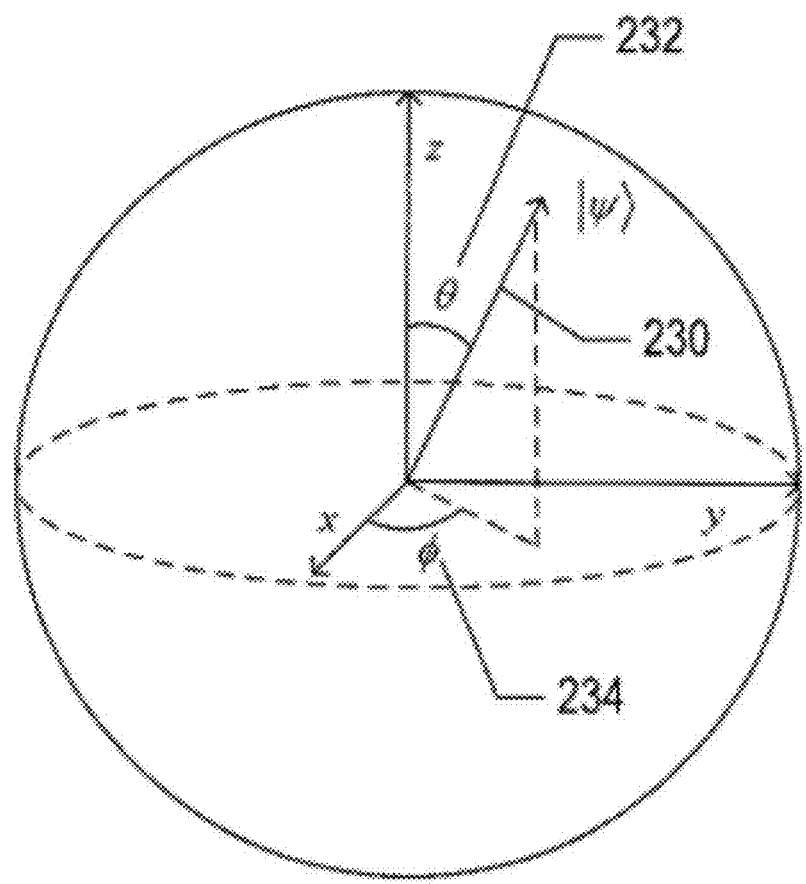

FIG. 2D shows a complete representation of the Bloch sphere for an arbitrary state vector $|\psi\rangle$. The state vector $|\psi\rangle$ 230 can be specified with two angles $\theta$ 232 and $\phi$ 234. Using the polar form for the complex coefficients $\alpha$ and $\beta$, state vector $|\psi\rangle$ can be expressed as:

$$|\psi\rangle = r_\alpha e^{i\phi_\alpha}|0\rangle + r_\beta e^{i\phi_\beta}|1\rangle.$$

As previously discussed, the squares of the magnitudes of the coefficients $\alpha$ and $\beta$ correspond to the probabilities that a measurement of a qubit in state $|\psi\rangle$ will return state vectors $|0\rangle$ and $|1\rangle$, respectively. The state vector $|\psi\rangle$ can be multiplied by an arbitrary complex number with unit modulus, $e^{i\gamma}$, without changing the magnitudes of the squares of the coefficients $\alpha$ and $\beta$, as shown by:

$$e^{i\gamma}|\psi\rangle = e^{i\gamma}r_\alpha e^{i\phi_\alpha}|0\rangle + e^{i\gamma}r_\beta e^{i\phi_\beta}|1\rangle,$$

$$|e^{i\gamma}r_\alpha e^{i\phi_\alpha}|^2 = e^{i\gamma}r_\alpha e^{i\phi_\alpha} e^{-i\gamma}r_\alpha e^{-i\phi_\alpha} = r_\alpha^2 = |\alpha|^2,$$

$$|e^{i\gamma}r_\beta e^{i\phi_\beta}|^2 = |\beta|^2.$$

Thus, there is a global phase-shift degree of freedom in the expression of a state vector that does not affect the measurable properties associated with the state.

The state vector $|\psi\rangle$ can alternately be expressed, using the Bloch-sphere angles shown in FIG. 2D, as:

$$|\psi\rangle = \cos\frac{\theta}{2}|0\rangle + e^{i\phi}\sin\frac{\theta}{2}|1\rangle.$$

A derivation of this expression from the previously presented expression $|\psi\rangle = r_\alpha e^{i\Phi_\alpha}|0\rangle + r_\beta e^{i\Phi_\beta}|1\rangle$ for the state vector $|\psi\rangle$ follows:

$$e^{-i\phi_\alpha}|\psi\rangle = e^{-i\phi_\alpha}r_\alpha e^{i\phi_\alpha}|0\rangle + e^{-i\phi_\alpha}r_\beta e^{i\phi_\beta}|1\rangle,$$
$$= r_\alpha|0\rangle + r_\beta e^{i(\phi_\beta - \phi_\alpha)}|1\rangle$$
$$= r_\alpha|0\rangle + r_\beta e^{i\phi}|1\rangle,$$
$$|\psi\rangle = r_\alpha|0\rangle + r_\beta e^{i\phi}|1\rangle,$$
$$x = r\sin\theta'\cos\varphi,$$
$$y = r\sin\theta'\sin\varphi,$$
$$z = r\cos\theta',$$
$$r = 1, r_\alpha \to z,$$
$$|\psi\rangle = \cos\theta'|0\rangle + e^{i\phi}\sin\theta'|1\rangle,$$
$$\theta = 2\theta',$$
$$|\psi\rangle = \cos\left(\frac{\theta}{2}\right)|0\rangle + e^{i\phi}\sin\left(\frac{\theta}{2}\right)|1\rangle.$$

The derivation uses a global phase factor to remove a phase coefficient from one of the terms and then employs spherical coordinate representations of the orthonormal axes x, y, and z as well as several substitutions to produce the final expression. In the current discussion, a qubit is treated as a mathematical object with the above-described properties. However, these mathematically-described qubits correspond to actual physical hardware qubits that can be implemented using any of a number of different physical implementations, including trapped ions, optical cavities, and individual elementary particles, molecules, or aggregations of molecules that exhibit qubit behavior.

Various different primitive operations, corresponding to logic circuits in a digital computer and to computer instructions that control operation of logic circuits, can be performed on classical bits to produce classical bits with possibly altered state values. These primitive operations are referred to as "gates." For example, when a signal corresponding to the state of a first bit is passed through a NOT gate and stored in a second classical bit, the state of the second classical bit is opposite from the state of the first classical bit. In fact, the NOT gate is the only fundamental, non-trivial, traditional, classical computing gate with a single-bit input and a single-bit output. By contrast, there are an infinite number of possible single-qubit quantum gates that change the state of a qubit. As can be seen in FIG. 2D, changing the state of a qubit changes the Block-sphere representation of the state. This change is generally viewed either as a rotation of the Block-sphere itself, generally resulting in a change of the basis vectors of the state vector, or is viewed as a rotation of the state vector within the Block sphere, generally resulting in a change of the coefficients of the state vector. Changing the state vector of a qubit is therefore referred to as a "rotation." A rotation, state change, or single-qubit quantum-gate operation is represented mathematically by a unitary 2×2 matrix with complex elements:

$$\begin{bmatrix} a & b \\ -b^* & a^* \end{bmatrix},$$

where a and b are complex numbers and the notation "x*" indicates the complex conjugate of x. A unitary 2×2 matrix U with complex elements can be defined as a 2×2 matrix U with the following property:

$$U^U U = UU^\dagger = I = \begin{bmatrix} 1 & 0 \\ 0 & 1 \end{bmatrix},$$

where $U^\dagger = \begin{bmatrix} a^* & -b \\ b^* & a \end{bmatrix}.$

The adjoint $U^\dagger$ of a unitary matrix Iris the complex-conjugate transpose of the unitary U and is the inverse of U, denoted $U^{-1}$. The fact that multiplication of the adjoint unitary operation by the unitary operation, or vice versa, produces the identity operator Id, or identity matrix I, can be seen by:

$$\begin{bmatrix} a^* & -b \\ b^* & a \end{bmatrix}\begin{bmatrix} a & b \\ -b^* & a^* \end{bmatrix} = \begin{bmatrix} a^*a+bb^* & a^*b-ba^* \\ ab^*-ab^* & bb^*+aa^* \end{bmatrix} = \begin{bmatrix} 1 & 0 \\ 0 & 1 \end{bmatrix},$$

since $$a^*a+bb^*=|a|^2+|b|^2=1.$$

Thus, the operation of a quantum gate on a qubit with state $|\psi\rangle$, where $|\psi\rangle$ is expressed in vector form as $$|\psi\rangle = \begin{bmatrix} \alpha \\ \beta \end{bmatrix},$$

can be expressed as left-hand multiplication of the state vector by the unitary matrix corresponding to the unitary operation:

$$\begin{bmatrix} a & b \\ -b^* & a^* \end{bmatrix}\begin{bmatrix} \alpha \\ \beta \end{bmatrix} = \begin{bmatrix} a\alpha+b\beta \\ -b^*\alpha+a^*\beta \end{bmatrix} = \begin{bmatrix} \alpha' \\ \beta' \end{bmatrix}.$$

In the current discussion, quantum gates and quantum circuits are generally single-qubit quantum gates and quantum circuits, and therefore are assumed to have 2×2 complex matrix representations.

Figure 3:
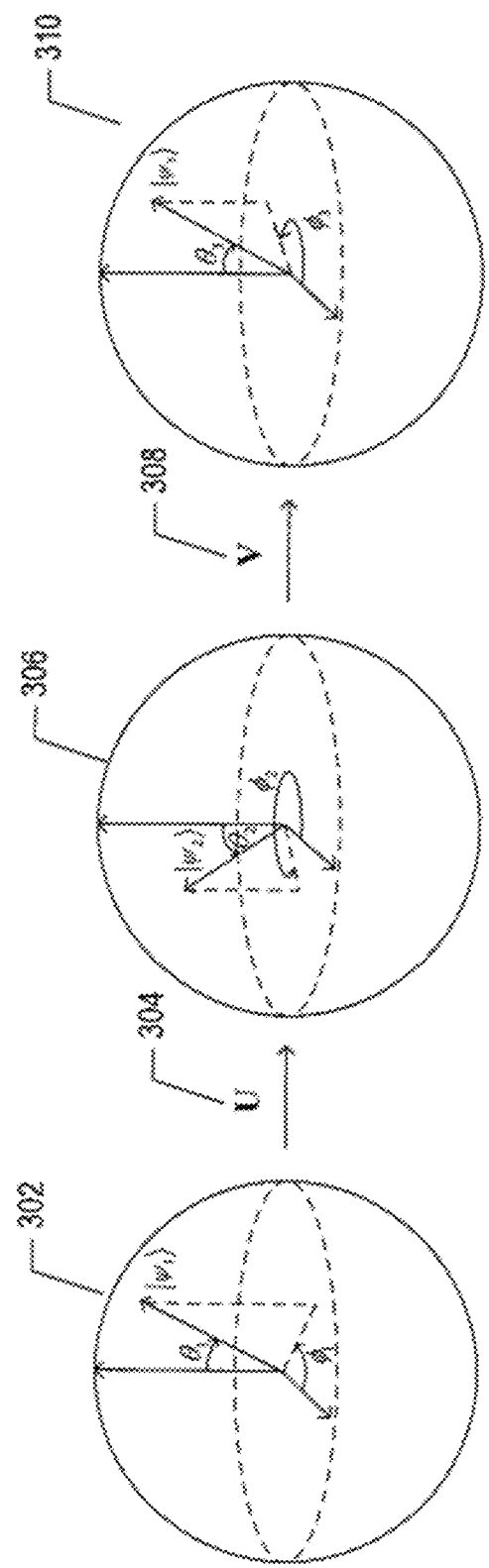
FIG. 3 illustrates a quantum circuit comprising two quantum gates.

FIG. 3 illustrates a quantum circuit comprising two quantum gates. In FIG. 3, a qubit in a first state $|\psi_1\rangle$, represented by the Bloch sphere 302, is transformed by unitary operation U 304 to a qubit in state $|\psi_2\rangle$, as represented by Bloch sphere 306, which is, in turn, transformed by unitary operation V 308 to place the qubit in state $|\psi_3\rangle$, as represented by Bloch sphere 310. This quantum circuit can be represented as the gate sequence UV which transforms the qubit as follows:

$$\overset{U}{\begin{bmatrix} U_{11} & U_{12} \\ U_{21} & U_{22} \end{bmatrix}}\overset{|\psi_2\rangle}{\begin{bmatrix} \alpha_1 \\ \beta_1 \end{bmatrix}} \to \begin{bmatrix} U_{11}\alpha_1+U_{12}\beta_1 \\ U_{21}\alpha_1+U_{22}\beta_1 \end{bmatrix} = \overset{=|\psi_2\rangle}{\begin{bmatrix} \alpha_2 \\ \beta_2 \end{bmatrix}},$$

$$\overset{V}{\begin{bmatrix} V_{11} & V_{12} \\ V_{21} & V_{22} \end{bmatrix}}\overset{|\psi_2\rangle}{\begin{bmatrix} \alpha_2 \\ \beta_2 \end{bmatrix}} \to \begin{bmatrix} V_{11}\alpha_2+V_{12}\beta_2 \\ V_{21}\alpha_2+V_{22}\beta_2 \end{bmatrix} =$$

$$\begin{bmatrix} V_{11}(U_{11}\alpha_1+U_{12}\beta_1)+V_{12}(U_{21}\alpha_1+U_{22}\beta_1) \\ V_{21}(U_{11}\alpha_1+U_{12}\beta_1)+V_{22}(U_{21}\alpha_1+U_{22}\beta_1) \end{bmatrix} = \overset{=|\psi_3\rangle}{\begin{bmatrix} \alpha_3 \\ \beta_3 \end{bmatrix}}.$$

Alternatively, one can multiply the two matrices representing operations U and V together to produce matrix W, and then left-hand multiply state vector $|\psi_1\rangle$ by W to produce the same result:

$$\overset{U}{\begin{bmatrix} U_{11} & U_{12} \\ U_{21} & U_{22} \end{bmatrix}}\overset{V}{\begin{bmatrix} V_{11} & V_{12} \\ V_{21} & V_{22} \end{bmatrix}} = \overset{W}{\begin{bmatrix} U_{11}V_{11}+U_{12}V_{21} & U_{11}V_{12}+U_{12}V_{22} \\ U_{21}V_{11}+U_{22}V_{21} & U_{21}V_{12}+U_{22}V_{22} \end{bmatrix}},$$

$$\overset{W}{\begin{bmatrix} U_{11}V_{11}+U_{12}V_{21} & U_{11}V_{12}+U_{12}V_{22} \\ U_{21}V_{11}+U_{22}V_{21} & U_{21}V_{12}+U_{22}V_{22} \end{bmatrix}}\overset{|\psi_1\rangle}{\begin{bmatrix} \alpha_1 \\ \beta_1 \end{bmatrix}} =$$

$$\begin{bmatrix} \alpha_1(U_{11}V_{11}+U_{12}V_{21})+\beta_1(U_{11}V_{12}+U_{12}V_{22}) \\ \alpha_1(U_{21}V_{11}+U_{22}V_{21})+\beta_1(U_{21}V_{12}+U_{22}V_{22}) \end{bmatrix} = \overset{|\psi_3\rangle}{\begin{bmatrix} \alpha_3 \\ \beta_3 \end{bmatrix}}.$$

A quantum circuit can therefore be specified as a sequence of quantum gates in which the quantum gates are symbolically represented or, equivalently, numerically represented. There are several ways to look at a quantum circuit. One can, as discussed above, multiply the matrices corresponding to the component quantum gates together in the order specified by the symbol sequence to produce a final, resultant, 2×2 complex matrix that represents the same state change, in a single operation or quantum gate, corresponding to the state change produced by sequential application of the quantum gates specified in the original symbol sequence. A quantum circuit can be viewed as a design for an actual hardware circuit in a quantum computer, where the hardware circuit needs to perform the operation specified by the single-gate representation of the quantum circuit, or can be viewed as a quantum-computing program, in which operations corresponding to the sequence of quantum gates represented by the symbol sequence are applied to a qubit in order to produce a final qubit state.

The term "quantum circuit" is thus somewhat interchangeable with the term "quantum gate," as a quantum circuit can be expressed as a resultant unitary operator. However, symbolically represented quantum circuits are useful in quantum circuit design for many reasons. In many cases, it is difficult to design and implement arbitrary physical quantum gates, but far easier to design and implement certain standard quantum gates, several of which are shown below. Error detection and correction is often needed for fault-tolerant quantum computing, but, in many cases, error-detection-and-correction methods have been worked out and are available for only certain well-known standard quantum gates. Designing and implementing quantum circuits as sequences of the well-known standard quantum gates provides a design and implementation to which error detection and error correction can be applied.

The matrix representations of a number of quantum gates, including the gates corresponding to single-qubit operators H, T, S, X, Y, and Z, are provided below:

$$H = \frac{1}{\sqrt{2}}\begin{bmatrix} 1 & 1 \\ 1 & -1 \end{bmatrix},$$

$$T = \begin{bmatrix} 1 & 0 \\ 0 & e^{i\frac{\pi}{4}} \end{bmatrix},$$

$$S = \begin{bmatrix} 1 & 0 \\ 0 & i \end{bmatrix} = TT,$$

$$X = \begin{bmatrix} 0 & 1 \\ 1 & 0 \end{bmatrix},$$

$$Y = \begin{bmatrix} 0 & -i \\ i & 0 \end{bmatrix},$$

$$Z = \begin{bmatrix} 1 & 0 \\ 0 & -1 \end{bmatrix}.$$

Quantum computers process data by applying a universal set of quantum gates that can emulate any rotation of the quantum state vector. A set of quantum gates may be considered to be "universal" when any unitary transformation can be approximately written as product of gates from this set. For any prescribed error bound, there exist gates $G_1$, $G_2$, ... $G_N$ from the gate set such that $G_N G_{N-1} \ldots G_2 G_1 \approx U$. Note that because the convention for matrix multiplication is to multiple from right to left, the first gate operation in this sequence, $G_N$, is actually the last one applied to the quantum state vector.

Figure 4:
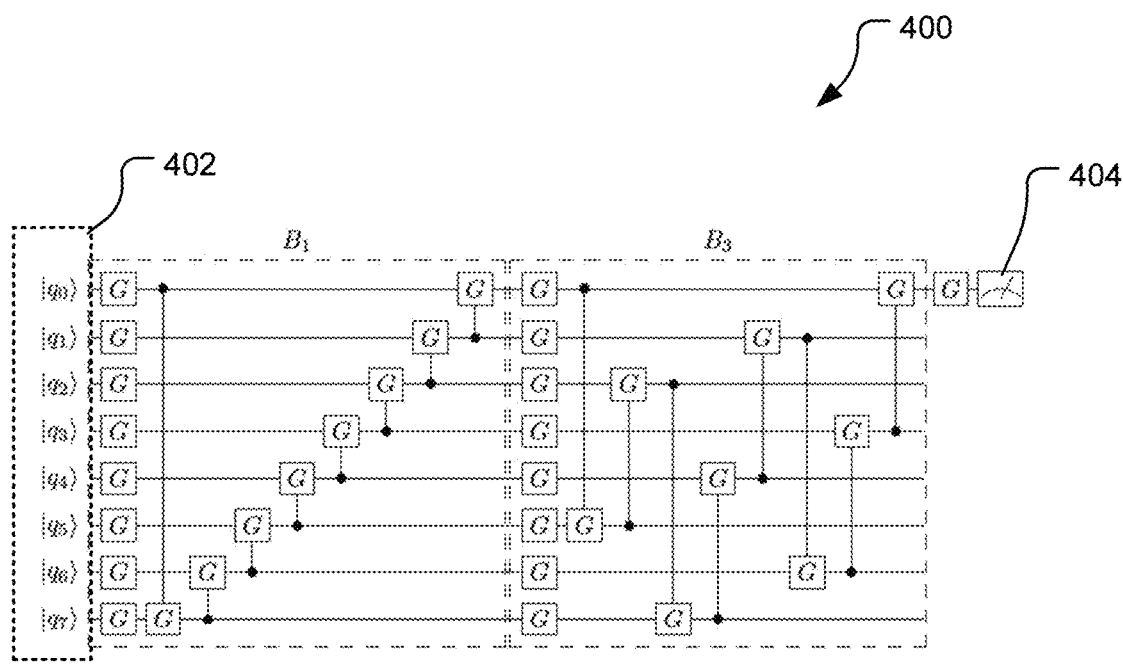
FIG. 4 illustrates one example representation of a quantum prediction circuit.

FIG. 4 illustrates one example representation of a quantum prediction circuit 400 trained to predict future data bits in a time-sequential sequence. According to one implementation, the quantum prediction circuit 400 includes characteristics and performs functions the same or similar to the quantum prediction circuit 104 described above with respect to FIG. 1.

Given an encoded feature vector $\varphi(x)=|b_0, b_1, b_2, b_3, b_4, b_5, b_6, b_7\rangle$, (the "input qubit register"), the gates (G) of the quantum prediction circuit 400 execute a sequence of quantum state transformations that map the encoded feature vector $\varphi(x)$ to an output vector $\varphi'(x)=U_\theta \varphi(x)$ by applying a unitary operation $U_\theta$, which is parameterized by a set of variables $\theta_j$. In the example quantum prediction circuit 400, the input feature vector $\varphi(x)$ is a quantum state vector encoding a sequential subset of a time-sequential sequence. When measured at an output measurement point 404, the transformed output state vector $\varphi'(x)$ collapses to a 1 or 0.

As explained above, there exists a set of 2-qubit unitary gates $G_N G_{N-1} \ldots G_2 G_1 \approx U$ where each gate can be represented by a unitary matrix parameterized by a set of variables θ. In the example circuit of FIG. 4, there are 33 single qubit gates (G1-33) that may each be represented by a unitary matrix with two parameters. To make the single qubit gates trainable, the gates are first formulated in terms of parameters that can be learnt by a machine learning system. A basic single qubit gate G in the proposed circuit is a 2×2 unitary, which can be written, for example, as:

$$G(\alpha, \beta) = \begin{pmatrix} e^{i\beta}\cos(\alpha) & -e^{-i\beta}\sin(\alpha) \\ e^{-i\beta}\sin(\alpha) & e^{-i\beta}\cos(\alpha) \end{pmatrix} \quad (1)$$

and is fully defined by two parameters (α, β).

Notably, the derivative of any one of the single qubit quantum gates G(α, β) is arrived at by taking derivatives of each of the variable introduced with respect to the parmetrisation introduced in equation (e.g., $\partial_\alpha G$, $\partial_\beta G$) and it can be seen that these derivatives are linear combinations of one another. Therefore, it can be assumed that the parameterized single qubit $G_i$ depends only on the parameter θ, where θ represents a set of parameters θ=α, β. Notably, the derivative of the circuit is therefore given by:

$$\partial \theta_j(U_\theta) = G_L \ldots (\partial \theta_j G_j) \ldots G_1 \quad (2)$$

Therefore, assuming a predefined, select number (J) of gates (G) in a rapidly-entangling quantum circuit, the quantum prediction circuit 400 can be trained using supervised learning to determine optimal transformations $\theta_j$ applied by each of the J gates to transform an input feature vector φ(x) to a known output vector $\varphi'(x)=U_{\theta_j}\varphi(x)$. Due to the fact that the derivative $\partial_\alpha G$, $\partial_\beta G$ are linear combinations of one another, it is possible to represent the entire $\partial \theta_j(U_{\theta_j})$ as a linear combination of unitaries. This is a key simplification that allows the parameters of the unitary $U_\theta$ to be estimated with reasonable precision. According to one implementation, the disclosed technology employs a stochastic gradient descent method to determine the collection of state vector transformations implemented by each gate $G_i$ in the unitary $U_\theta$. An example particularized solution to this problem is discussed below with respect to FIG. 5, below.

In the particular example of FIG. 4, the quantum prediction circuit 400 is a rapidly-entangling circuit provided with an input qubit register 402 that stores 8 qubits. The depth and size of the quantum prediction circuit 400 may vary considerably in different implementations. It can be shown that a circuit with the geometry as shown in FIG. 4 can be reduced to an equivalent one where each $G_j$ is a composition of two orthoganol rotations, say, $G_j = \exp(-i\theta_{j,z}Z)\exp(-i\theta_{j,y}Y)$. Therefore, the number of parameters in this exemplary setup is actually twice the number of gates in the circuit.

The exemplary quantum prediction circuit 400 consists of two "code blocks" B1 and B3 with 17 trainable single-qubit gates G=G(α, β) as well as 16 trainable controlled single qubit gates C(G) (e.g., with parameters tied to match one of the controlled gates). If optimization methods are used to reduce the controlled gates to a single parameter (e.g., θ, such that θ=α, β), the circuit 400 has 3×33+1=100 parameters to learn in total. These 100 parameters are used to classify inputs of $2^8$=256 dimensions, which is a much more compact model than a conventional feed-forward neural network.

Figure 5:
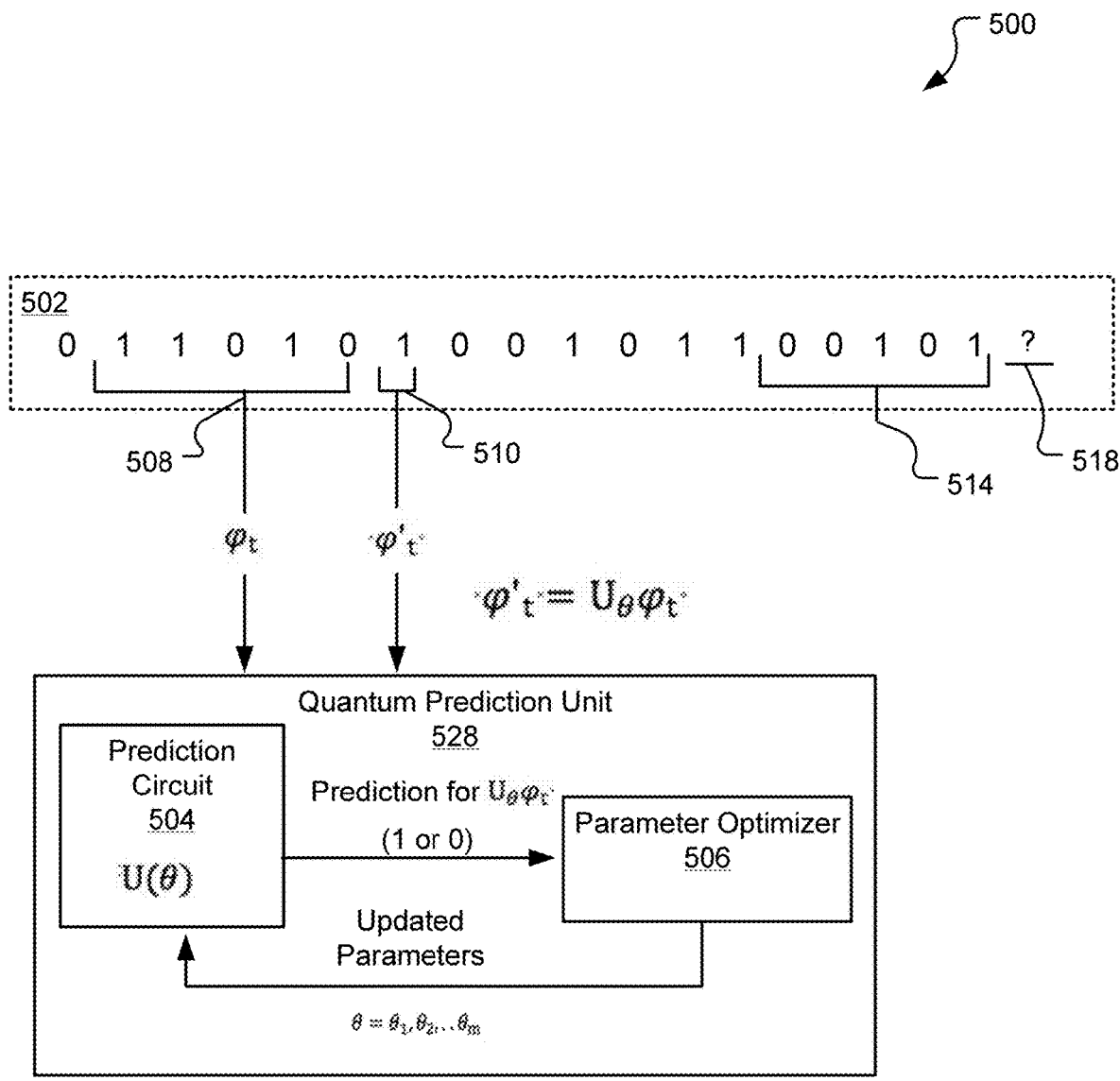
FIG. 5 illustrates a quantum AI prediction system employing logic to train a quantum prediction circuit with a supervised learning technique to predict a future bit in a time-sequential data series.

FIG. 5 illustrates a quantum AI prediction system 500 employing logic to train a quantum prediction circuit 504 to predict a future bit in a time-sequential data series 502. The quantum prediction circuit 504 is shown within a quantum prediction unit 528 that also includes a parameter optimizer 506. During multiple different iterations of a training process, a subset of the time-sequential data series 502 is selected (e.g., a subset 508) that is of a predefined length 's', referred to herein as an "s-gram." This subset 508 is encoded as an input feature vector φ(t) (a qubit register) and a future data point 510 immediately following the subset 508 is also encoded as a desired output feature vector φ'(t), where this vector φ'(t) represents the hypothetical output of the quantum prediction circuit 504 provided that the series of gates ($U_\theta$) within the circuit successfully transform the input vector such that $U_\theta \varphi_t = \varphi'_t$.

Upon receipt of the input qubit register φ(t) and the desired output register φ'(t), the prediction circuit 504 is run based on initial parameter values (e.g., default or randomly selected values), and the circuit outputs a prediction for $U_\theta \varphi_t$ (e.g., a 1 or 0). This prediction is provided to the parameter optimizer 506 along with the corresponding input feature vector φ(t) and the desired output feature vector φ'(t). According to one implementation, the parameter optimizer 506 applies a stochastic gradient methodology to determine recommend an adjustment to the parameters $\theta_j$ such that the $U_\theta \varphi_t$ output by the circuit more closely represents the desired output feature vector $\varphi'_t$. This process is repeated multiple times, with different s-grams from the time-sequential sequence 502, adjusting the parameters $\theta_j$ each time until the unitary $U_\theta$ applied by the circuit is estimated with significant precision.

In determining the adjusted parameters for $\theta_j$ at each training iteration, the parameter optimizer 506 effectively determines a quantum state transformation applied by each of J gates ($G_1 G_2 \ldots G_J$) within the quantum prediction circuit 504, where J is a preselected number referred to as the circuit depth. An example methodology employed by the parameter optimizer 506 is discussed below.

Predictor Design

The forecast of any future data bit at time t in a time-sequential data series can, given the previous bits in the time-sequential data series, be understood as the task of sampling from the conditional probability distribution:

$$P_t = p(b_t = 1 | b_{t-1}, b_{t-2}, \ldots, b_0) \quad (3)$$

which can be interpreted as the probability of measuring eigenvalue 1 of a certain parameterized observable on an s-qubit register (e.g., a qubit register of length 's') that is input to the quantum prediction circuit 504 of the form $|\varphi\rangle = |b_{t-1}, b_{t-2}, \ldots, b_0\rangle$, where the letter "b" represents the index of the data bit in the input s-qubit and $b_{t-s}$ is the data bit that is generated at the round number t−s. Stated differently, $P_t$ is the probability of measuring one of the qubits in the state $U(\theta)\varphi_t$, which is represented in Direct notation as $U(\theta)|\varphi_t\rangle$. If it is assumed that the correlation between $b_t$ and $b_{t-s}$ decays exponentially as s grows indefinitely, there exists an effective depth s within the series such that equation (3) above is a good approximation for the probability $P_t$ for large enough values of t. Thus, a suitable length for 's' (e.g., the length of the subset of data bits encoded in the input vector $\varphi_t$) can be determined using known mathematical techniques.

At the point of time t, a state preparation circuit (not shown) of the AI prediction system 500 initializes the input qubit register (e.g., encoding the subset 508), which has indices from 1 to s with the pure state $|\varphi_t\rangle = |b_{t-1}, b_{t-2}, \ldots, b_0\rangle$ in standard computational basis. Provided that $U(\theta_j)$ is a parameterized unitary on the s-qubit register with polynomially many learnable parameters $\theta_j$, a basis for a supervised machine learning training is given by equation 4 below, which represents the probability of measuring zero as the separation between the input vector $\varphi_t$ and the output vector $\varphi'_t$ after the input vector $\varphi_t$ is acted on by the unitary $U(\theta_j)$:

$$P_0 = \langle U_\theta(\varphi_t) | P_0 | U_\theta(\varphi_t) \rangle \quad (4)$$

In the implementation where the quantum prediction circuit 504 is trained to predict a next future bit in the time-sequential sequence 502 immediately following the subset 508 of data bits that are encoded in the s-qubit input register, the projected vector (e.g., the bolded term above) corresponds to the encoded, known future bit 510 (also denoted herein as $\varphi'_t$) immediately following the subset 508 of data points encoded in the s-qubit register input to the model.

Note, the probability function $P_0$ appearing in equation 4 above is further represented by:

$$P_0 = \tfrac{1}{2}(I+Z) \otimes I^{s-1} \quad (5)$$

where I is the identity matrix, Z is the Z-gate and s is the length of the s-qubit input to the quantum prediction circuit.

As stated above, the parameter optimizer 506 implements logic that aims to maximize the probability of mean overlap between (1) a quantum state generated by $U_\theta$ acting on the known input feature vector $\varphi_t$ and (2) the known desired output for the model $\varphi'_t$ (e.g., the encoded next bit in the time-sequential data sequence 502). The utility function for this problem is given by equation 6 below:

$$L(\theta_j) = \sum_{s=0}^{S} \langle U_{\theta_j}(\varphi_t) | P_0 | U_{\theta_j}(\phi_t) \rangle \quad (6)$$

where the sum is taken over multiple s-grams (e.g., the subset 508 is one example s-gram) from s=0 through s=S where S is a predetermined number of samples from the time-sequential sequence that is deemed sufficient for estimating the probability $P_0$ to precision. Here, $U_{\theta_j}$ can be simplified as:

$$U_{\theta_j} = U_1(\theta_1) \ldots U_J(\theta_J) \quad (7)$$

where "J" is a preselected number of gates selected prior to initialization of the parameter optimization and θ represents the set of parameters θ=α, β, γ within each single qubit gate. Here, it is assumed that $U_j(\theta_j)$ is a unitary depending on only one subparameter $\theta_j$ and that $\theta_1, \ldots, \theta_J$ are all distinct. The maximum probability of overlap between the quantum state generated by $U_\theta$ acting on the known input feature vector $\varphi_t$ and the known desired output value $\varphi'_t$ is therefore found by taking the gradient of equation 6 with respect to θ and solving for the values for the parameters $\theta_j$ that maximize this expression for each of the J predetermined number of gates.

Using the above simplification, an approximation for the gradient of equation 6 can be obtained using overlap estimators for a set of coherent unitary circuits, closely related to $U(\theta_t)$. This can be represented as:

$$\partial_{\theta_j}\left(\langle U_{\theta_j}(\varphi_t)|P_{0(t)}|U_{\theta_j}(\varphi_t)\rangle\right) = \qquad (7)$$

$$2\Re\left(\left\langle U_1 \ldots \frac{\partial U_j(\theta_j)}{\partial(\theta_j)} \ldots U_N \varphi_t \middle| P_{0(t)} \middle| U_{\theta_t}(\varphi_t) \right\rangle\right)$$

where $\varphi_t$ is the input qubit register at each training iteration and the bolded term at the right-hand side of this expression $(U_{\theta_j}(\varphi_t))$ can be replaced with the desired model output (e.g., qubit register corresponding to the future data point 510), which represents the value of the next known sequential bit in the sequence 502 following the bits encoded in the input register $\varphi_t$. In the above, whenever $U_j\theta_j$ is an axial single-qubit rotation by the angle $\theta_j$, then $$\frac{\partial U_j(\theta_j)}{\partial(\theta_j)}$$

is also a rotation about a same axis by a deterministically modified angle. Therefore, the right-hand side of equation 7 is obtained as an overlap of two unitary states across one projector to an eigenspace of $P_{0(j)}$.

With this, the expression to be maximized by the parameter optimizer 506 is therefore the gradient of the utility function, which is:

$$\frac{\partial L(\theta_t)}{\partial(\theta)} = \sum_{s=0}^{S} 2\Re\left(\left\langle U_1 \ldots \frac{\partial U_j(\theta_j)}{\partial(\theta_j)} \ldots U_N \varphi_t \middle| P_{0(t)} \middle| U_{\theta_t}(\varphi_t) \right\rangle\right) \qquad (8)$$

summed over 'S' s-grams previously input to the quantum prediction circuit during circuit training.

In one implementation, the parameter optimizer 506 utilizes a stochastic gradient descent method to compute the parameter values that minimize the separation between its inputs (e.g., vector $\varphi_t$ and the known output vector $\varphi'_t$) by solving for the values of $\theta_j$ (where j=0 through J number of gates) that maximize the right-hand size of the expression given in equation 8, above.

Stochastic gradient descent is a heuristical strategy aimed at maximizing individual terms of the sum instead of genuinely maximizing the entire sum. The intuition for this strategy is the belief that upon a "right" move in parameter space, the increase in certain terms outweigh the decrease in certain other terms more often than not. Notably, the parameters that define ever single qubit gate of the quantum prediction circuit 504 are at every stage of parameter optimization classical values. However, the parameter optimizer 506 may compute the model function $U_{\theta_j}$ on a quantum device such that there is no classical access to the gradients of the function. In this implementation, the training procedure is a hybrid scheme that combines classical processing to update the parameters and quantum information processing to extract the gradients. Thus, the parameter optimizer 506 may be understood as having both a classical computing system and a quantum computing system, where the quantum computing system is used to extract estimates of the analytical gradients.

According to one implementation, the gradients of equation 8 are extracted using a single-batch gradient descent approach where only one randomly sampled training input is considered in each iteration. Single batch stochastic gradient descent can have favorable convergence properties, for example, in cases where there is a large amount of data available.

Using the above-described techniques, the parameter optimizer 506 computes the parameters $\theta_j$ that maximize the gradient shown in equation 8 at each training iteration with a new s-gram input feature vector within a single epoch. (Note: some implementations may repeat the training process for the time-sequential sequence 502 across multiple epochs, discussed elsewhere herein). According to one implementation, the parameter optimizer 506 uses the following parameter update rule to systematically vary values of $\theta_j$ while using a stochastic gradient descent methodology to recommend adjustment to the set of parameter values $\theta_j$ at each training iteration. In one implementation, for updating the $\theta_j$ at step j the following update rule is utilized:

$$\theta_{j+1} = \theta_j + \lambda \sum_{t=j-mb}^{j} \Delta_{\theta_j} \langle U_{\theta_j}(\varphi_t)|P_0|U_{\theta_j}(\varphi_t)\rangle \qquad (9)$$

where $\Delta_{\theta_j}$ is the gradient, $\lambda$ is a small factor known as the learning rate, and mb is the minibatch size.

For each encoded input s-gram (e.g., 508) and corresponding encoded "next bit" in the sequence (e.g., 510), the parameter optimizer 506 computes updated parameters (e.g., adjusting the computed parameters from the last round). This parameter computation may be repeated multiple times (across all s-grams in the training sequence and then repeated for multiple epochs) until the model solution for the parameters $\theta_j$ satisfy a target accuracy rate when tested on a validation set. The full data process comprising the sweep through the various s-grams process may be repeated for multiple epochs. The validation set includes an input and output vector associated with the time-sequential series 502 that are not used to train the model.

After a sufficient number of training iterations resulting in a model that satisfies the target accuracy rate, the final version of the quantum prediction circuit 504 is constructed according to the computed parameters. Responsive to receipt of any s-gram in the sequence (e.g., the last s-gram 514), the quantum prediction circuit 504 outputs a prediction (e.g., a 1 or 0) that predicts an immediately preceding future bit 518 in the sequence.

Figure 6:
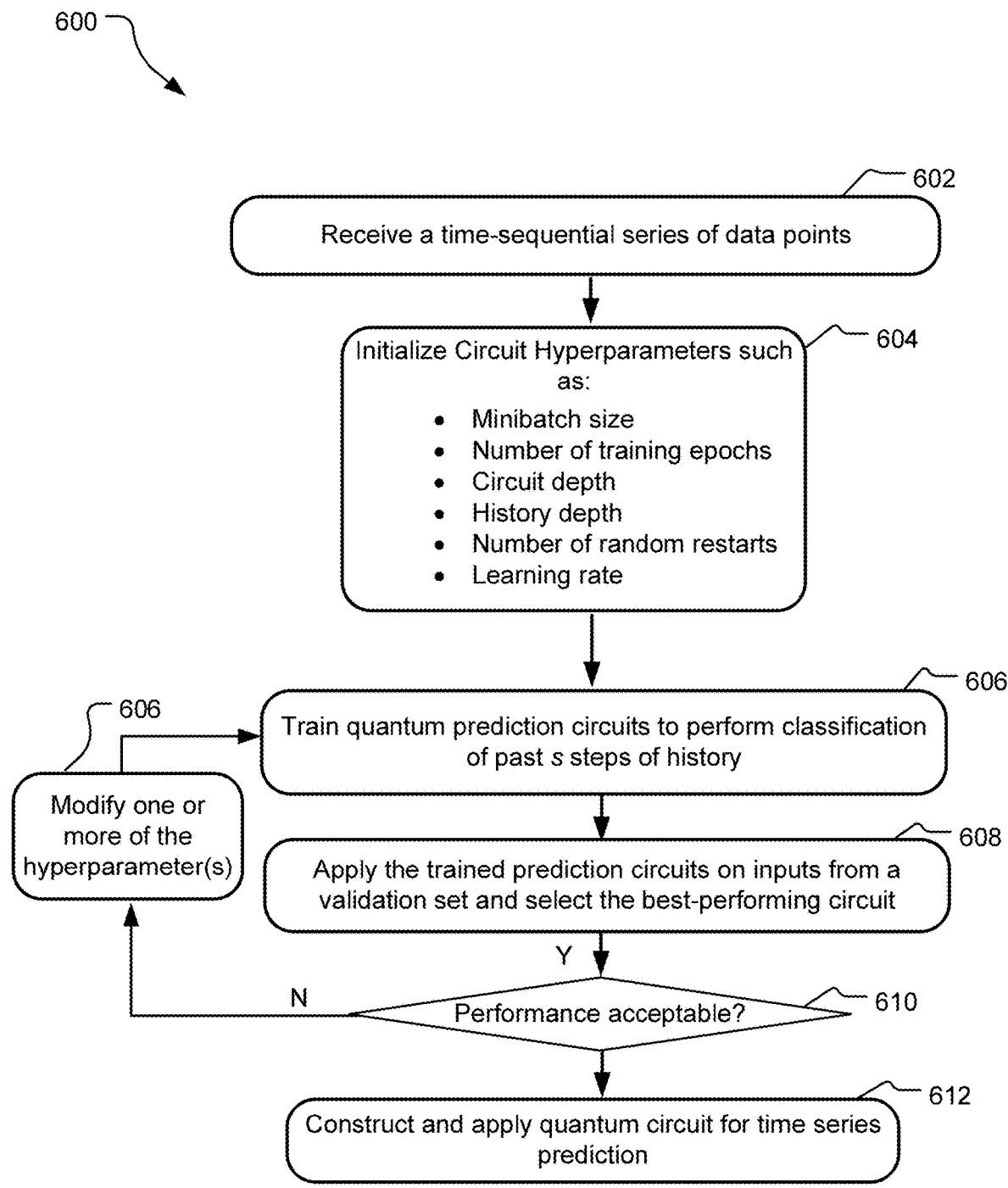
FIG. 6 illustrates example operations for training and constructing a quantum prediction circuit capable of predicting a future data bit in a time-sequential sequence given a model trained on historical subsets of the same time-sequential sequence.

FIG. 6 illustrates example operations 600 for training and constructing a quantum prediction circuit capable of predicting a future data bit in a time-sequential sequence given a model trained on historical subsets of the same time-sequential sequence. A receiving operation 602 receives an a time-sequential data sequence as input. A hyperparameter initialization operation 604 initializes a number of hyperparameters that may be varied one or more times throughout training iterations of the quantum prediction circuit. By example and without limitation, these parameters may include one or more of the following:

Circuit Depth: the circuit depth refers to the number of gates within the model circuit, each having an unknown parameter $\theta_j$ where j represents the gate index.

History Depth: the history depth refers to the length of the s-gram that is encoded as an input feature vector (e.g., s-gram represented by the subset 508 of length 5 shown in FIG. 5).

Learning Rate: the learning rate refers to the value $\lambda$ given in equation 9, above, which is used in computing the step size variation of the stochastic gradient descent methodology.

Number of Random Restarts: the number of random restarts refers to a number of times that the stochastic gradient descent methodology is repeated at a single training iteration to solve for the same parameters $\theta_j$ based on a same input and output feature vector. In order to increase the chances of finding a good local optimum, multiple initializations of the started parameter vector have been considered and evaluated in parallel. For example, each time this process is restarted, new random start points are selected for $\theta_j$ and these parameters are varied per the step size adjustment given equation 9 until the expression given by equation 8 is maximized. When multiple such models are initialized in parallel with different random starting points, the prediction model with the best values of the training function (e.g., the highest maximization of equation 8) can be selected for actual use in the quantum prediction circuit. In some cases, a greater number of random restarts may result in a higher-performing prediction circuit.

Number of training epochs: Due to the randomized nature and relatively slow convergence of the stochastic gradient descent strategy, the usual practice in stochastic learning is to make multiple passes through the training data. In machine learning lingo, such passes are known as epochs. When applied to time series prediction, the multi-epoch training of the predictor $U_{\theta_j}$ means making several passes through the entire bit history $b_{t-1}$, $b_{t-2}$, ... $b_0$. For example, multiple input and output vector pairs may be used to train the circuit and thereby derive the optimized parameters $U_{\theta_j}$ for a given time-sequential series. After such training, the entire process may be repeated in multiple epochs. Varying the number of epochs can influence performance of the model.

Minibatch size: In traditional gradient descent, each iteration uses the entire training data set to compute the gradient (e.g., the gradient shown in FIG. 9). In contrast, stochastic gradient descent is performed by randomly selecting one example in each training iteration to compute this gradient. A variation on this approach is to perform random uniform sampling from the training dataset for each iteration to form a mini-batch and then use the mini-batch to compute the gradient. Varying the size of the mini-batch can lead to different model results.

After the hyperparameter values are initialized, a training operation 606 trains a quantum circuit to perform classification of a number of past steps in the time-sequential series of data points. In one implementation, multiple different circuits are trained in parallel with different starting values for the unitary parameters.

A testing and selection operation 608 tests a validation set on each of the trained circuits and selects the best performing model. A determination operation 610 determines whether the selected (best-performing) quantum circuit satisfies predefined performance criteria. If so, a construction and application operation 612 constructs the selected quantum circuit for use in predicting future steps in the time-sequential sequence. If the determination operation 610 determines that none of the trained models satisfy the performance criteria, a hyperparameter adjustment operation 614 modifies one or more of the hyperparameters and the operations 606, 608, and 610 are repeated until a trained model satisfies the performance criteria.

Figure 7:
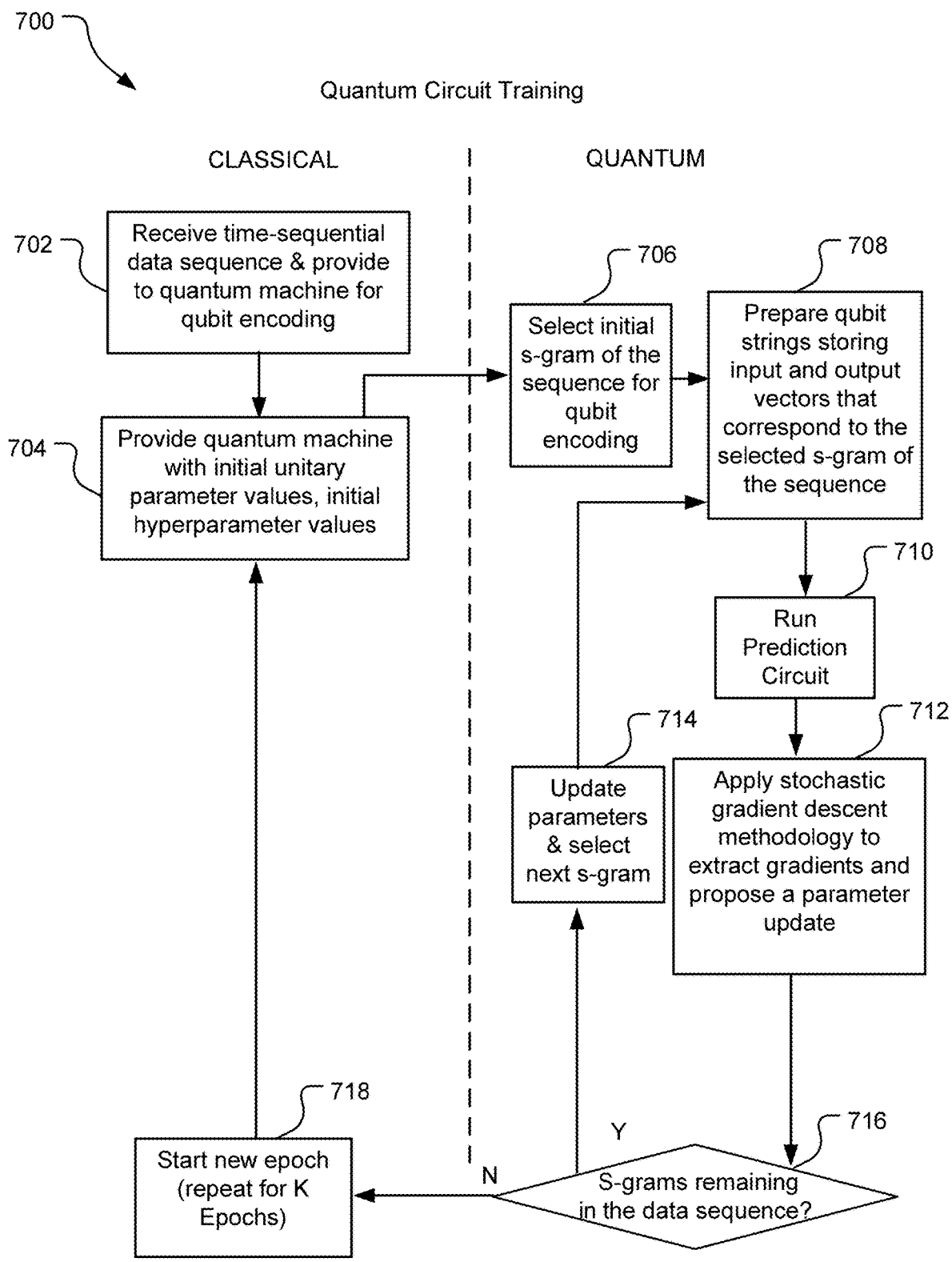
FIG. 7 illustrates example training operations for training a quantum prediction circuit.

FIG. 7 illustrates example training operations 700 for training a quantum prediction circuit. Some of the training operations 700 are performed by a classical computer and others are performed by a quantum computer. A classical computer 702 receives a time-sequential sequence of data points and provides the sequence to a quantum machine for an amplitude encoding operation. In one implementation, the sequence is a human-generated sequence. For example, a user may provide the classical computer with a selection of 1s and 0s that the user randomly selects. Due to the human inability to select a truly random sequence, the sequence will necessarily incorporate some detectable patterns such that the quantum prediction circuit can learn to predict a future bit in the sequence before the user selects it. In another implementation, the sequence is not human generated. For example, the sequence represents a series of time-stamped measurements.

The classical computer performs a parameter selection operation 704 and provides the quantum computer with initial unitary parameters and hyperparameter values for a prediction circuit. The quantum computer selects an initial s-gram 706 of the sequence and performs an amplitude encoding operation 708 that encodes a qubit string pair including (1) the selected s-gram from the time-sequential sequence and (2) a data bit immediately following the selected s-gram within the sequence. A circuit execution operation 710 runs a quantum prediction circuit based on the initial unitary parameters and hyperparameter values and outputs a prediction. A parameter optimization operation 712 applies a stochastic gradient descent methodology to extract gradients from a dataset based on the output prediction, input vector, and output vector and outputs a proposed update to the unitary parameters based on the extracted gradients.

A determination operation 716 determines whether there exist any s-grams remaining in the data sequence. If so, an updated parameter selection operation 714 updates the unitary parameters based on the proposed parameter update and selects a next s-gram In this way, updated parameters are calculated and adjustments are implemented with respect to each s-gram in the time-sequential sequence. When the determination operation 716 determines that there are no remaining s-grams in the sequence, an epoch iteration operation 718 initiates a new "epoch" of the training circuit in which the unitary parameters and hyperparameter values are re-initialized, the sequential data sequence is again scanned for s-grams, circuit predictions are run, stochastic gradients are estimated, and proposed parameters updates are determined and updated multiple times (e.g., for each s-gram), as described above. This process is repeated for K (a predetermined number) epochs, and the parameters of the best performing epoch are used to program the final prediction circuit.

Figure 8:
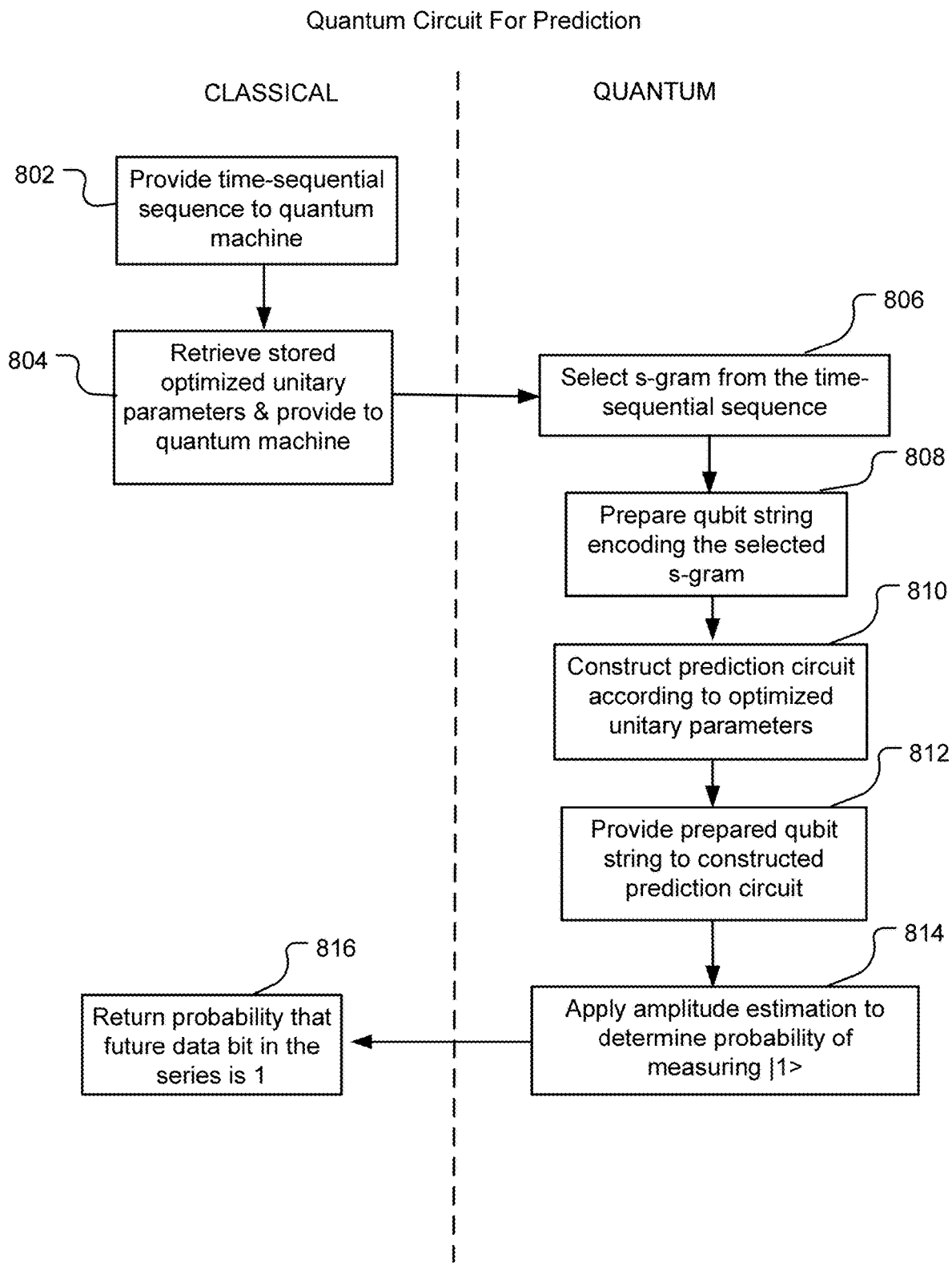
FIG. 8 illustrates example operations for using a trained quantum prediction circuit to predict a future data point in a time-sequential sequence of data points.

FIG. 8 illustrates example operations 800 for using a trained quantum prediction circuit to predict a future data point in a time-sequential sequence of data points. Some of the operations 800 are performed by a classical computer while others are performed by a quantum computer. At provisioning operation 802, a classical computer provides a time-sequential sequence to a quantum machine for amplitude encoding of one or more s-grams for a bit prediction operation. In addition to the time-sequential sequence, the classical computer also retrieves stored, optimized parameters for a unitary matrix (e.g., parameters optimized at the series of operations 700) and provides these parameters to the quantum machine parameter retrieval and provisioning operation 804. A selection operation 806 selects an s-gram from the time-sequential sequence representing a set of data points immediately prior to a future data point that is to be predicted by the quantum prediction circuit. A state preparation circuit performs a qubit string encoding operation 808 to amplitude encode the selected s-gram as an input qubit string, and a circuit preparation operation 810 constructs a prediction circuit according to the optimized unitary parameters.

A providing operation 812 provides the constructed prediction circuit with the prepared qubit string. The quantum computer performs a measuring operation 814 that applies amplitude estimation to measure a probability of measuring 1 at the output of the prediction circuit. This probability is provided back to the classical computer and the classical computer returns this probability to the user at output operation 816.

Figure 9:
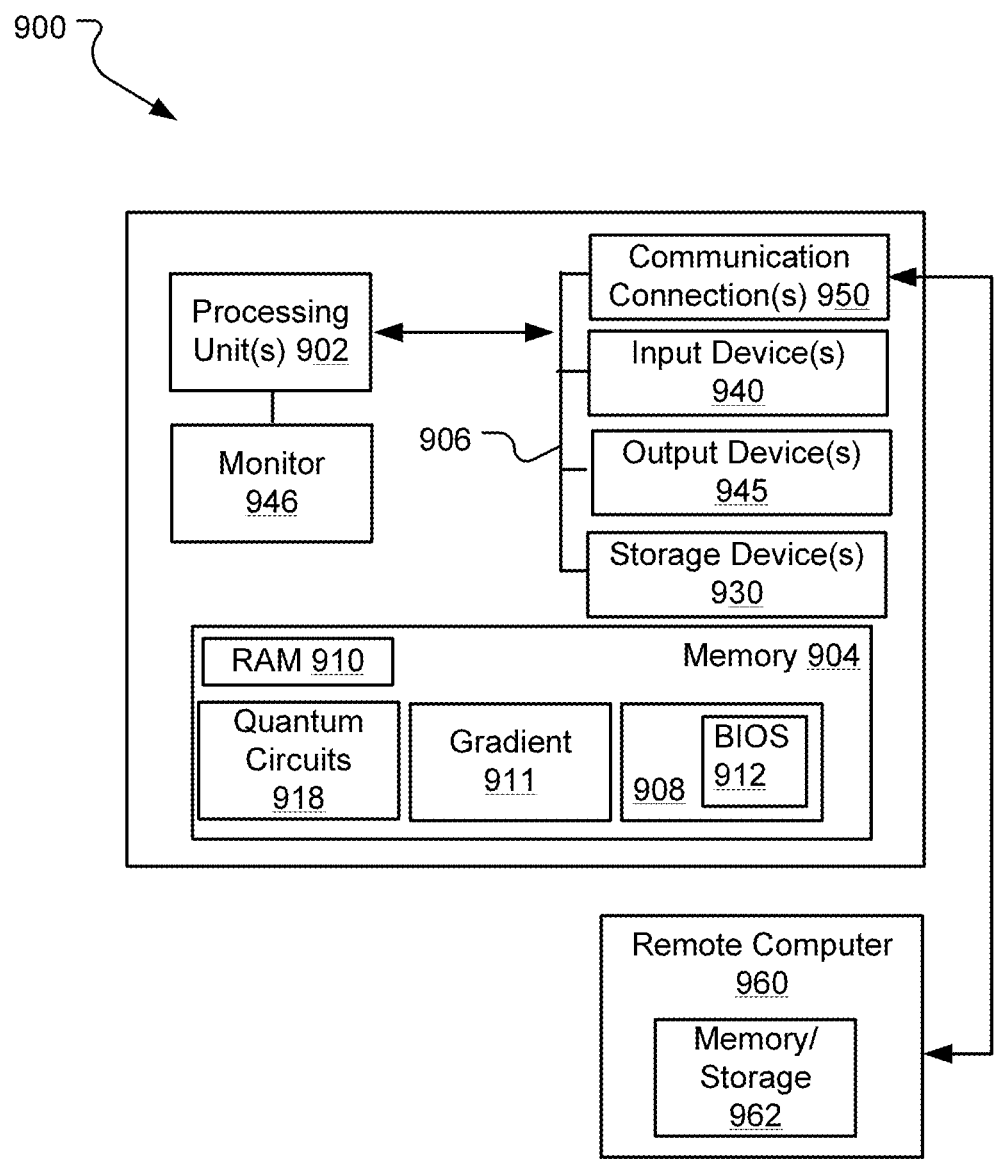
FIG. 9 and the following discussion are intended to provide a brief, general description of an exemplary computing environment in which the disclosed technology may be implemented.

FIG. 9 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices. Typically, a classical computing environment is coupled to a quantum computing environment, but a quantum computing environment is not shown in FIG. 9.

With reference to FIG. 9, an exemplary system for implementing the disclosed technology includes a general purpose computing device in the form of an exemplary conventional PC 900, including one or more processing units 902, a system memory 904, and a system bus 906 that couples various system components including the system memory 904 to the one or more processing units 902. The system bus 906 may be any of several types of bus structures including a memory bus or memory controller, a peripheral bus, and a local bus using any of a variety of bus architectures. The exemplary system memory 904 includes read only memory (ROM) 908 and random access memory (RAM) 910. A basic input/output system (BIOS) 912, containing the basic routines that help with the transfer of information between elements within the PC 900, is stored in ROM 908.

In on implementation, the system memory 904 stores gate parameter definitions and hyperparameters that are used to configure a quantum computer to predict future bits in a time-sequential series of data points. Computer-executable instructions are also stored for receiving precisions as well as communicating circuit definitions and states to be used. Instructions for gradient determination and evaluation are stored at 911. In some examples, the PC 900 is provided with hyper parameters and gate parameters so as to define a trained quantum prediction circuit that receives inputs (e.g., subsets of a time-sequential data series) and that produces output predictions.

The exemplary PC 900 further includes one or more storage devices 930 such as a hard disk drive for reading from and writing to a hard disk, a magnetic disk drive for reading from or writing to a removable magnetic disk, and an optical disk drive for reading from or writing to a removable optical disk (such as a CD-ROM or other optical media).-Such storage devices can be connected to the system bus 906 by a hard disk drive interface, a magnetic disk drive interface, and an optical drive interface, respectively. The drives and their associated computer readable media provide nonvolatile storage of computer-readable instructions, data structures, program modules, and other data for the PC 900. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored in the storage devices 930 including an operating system, one or more application programs, other program modules, and program data. Storage of computer-executable instructions for training procedures and configuring a quantum computer can be stored in the storage devices 930 as well as or in addition to the memory 904. A user may enter commands and information into the PC 900 through one or more input devices 940 such as a keyboard and a pointing device such as a mouse. Other input devices may include a digital camera, microphone, joystick, game pad, satellite dish, scanner, or the like. These and other input devices are often connected to the one or more processing units 902. through a serial port interface that is coupled to the system bus 906, but may be connected by other interfaces such as a parallel port, game port, or universal serial bus (USB). A monitor 946 or other type of display device is also connected to the system bus 906 via an interface, such as a video adapter. Other peripheral output devices 945, such as speakers and printers (not shown), may be included.

The PC 900 may operate in a networked environment using logical connections to one or more remote computers, such as a remote computer 960. In some examples, one or more network or communication connections 950 are included. The remote computer 960 may be another PC, a server, a router, a network PC, or a peer device or other common network node, and typically includes many or all of the elements described above relative to the PC 900, although only a memory storage device 962 has been illustrated in FIG. 9. The personal computer 900 and/or the remote computer 960 can be connected to a logical a local area network (LAN) and a wide area network (WAN). Such networking environments are commonplace in offices, enterprise wide computer networks, intranets, and the Internet.

When used in a LAN networking environment, the PC 900 is connected to the LAN through a network interface. When used in a WAN networking environment, the PC 900 typically includes a modem or other means for establishing communications over the WAN, such as the Internet. In a networked environment, program modules depicted relative to the personal computer 900, or portions thereof, may he stored in the remote memory storage device or other locations on the LAN or WAN. The network connections shown are exemplary, and other means of establishing a communications link between the computers may be used.

Figure 10:
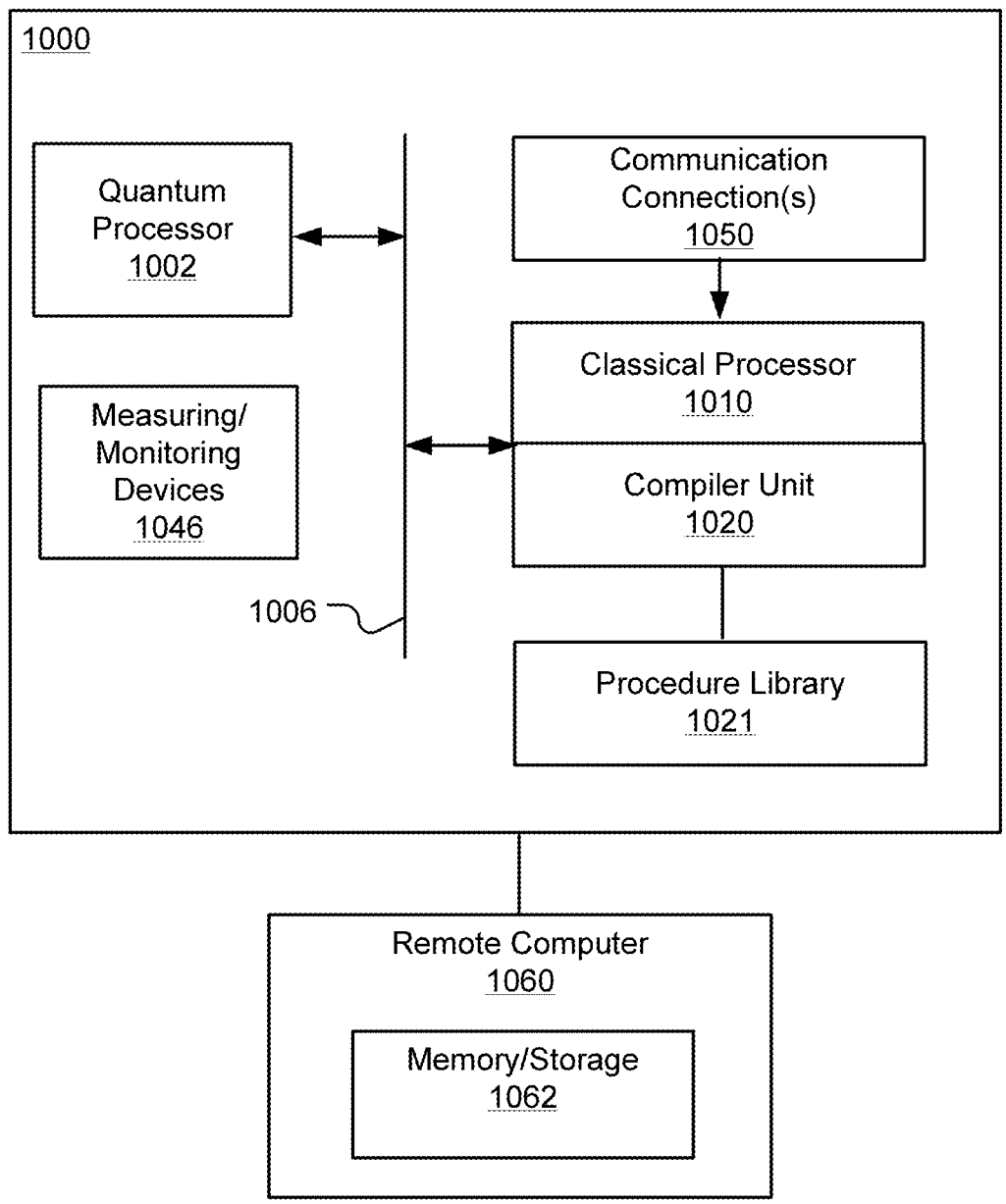
FIG. 10 illustrates exemplary computing environment for implementing the disclosed technology including a quantum processing unit and one or more monitoring/measuring device(s).

FIG. 10 illustrates exemplary computing environment 1000 for implementing the disclosed technology including a quantum processing unit 1002 and one or more monitoring/measuring device(s) 1046. The quantum processing unit 1002 executes quantum circuits that are precompiled by classical compiler unit 1020 utilizing one or more classical processor(s) 1010. Quantum circuits are downloaded into the quantum processing unit via a quantum bus 1006 based on training instructions and specified circuit parameters, such as quantum state preparation procedures described above.

In one implementation, the classical compiler unit 1020 compiles a high-level description of a quantum algorithm into a sequence of quantum circuits. Such high-level description may be stored, as the case may be, on one or more external computer(s) 1060 outside the computing environment 1000 utilizing one or more memory and/or storage device(s) 1062, then downloaded as necessary into the computing environment 1000 via one or more communication connection(s) 1050. Alternatively, the classical compiler unit 1020 is coupled to a classical processor 1010 and a procedure library 1021 that contains some or all procedures or data necessary to implement the methods described above such as stochastic gradient descent parameter optimization An example quantum AI prediction system disclosed herein predicts data bits in a time-sequential sequence of data points. The system comprises a quantum prediction circuit that is adapted to receive an input vector representing a subset of the time-sequential sequence; encode the input vector as a corresponding qubit register; apply a trained quantum circuit to the qubit register; and measure one or more qubits output from the quantum prediction circuit to infer a next data point in the time-sequential sequence following the subset of the time-sequential sequence represented by the input vector.

In another example quantum AI prediction system of any preceding quantum AI prediction system, the quantum prediction circuit is trained to maximize a probability of mean overlap between a quantum state generated by a parameterized unitary matrix acting on an encoded subset of the sequence of time-sequential data points and a quantum state of an encoded next sequential data point in the time-sequential sequence immediately following the data points of the encoded subset.

In still another example quantum AI prediction system of any preceding quantum AI prediction system, maximizing the probability of mean overlap includes determining a gradient of a utility function with respect to an array of parameters $\theta_j$ where each index in the array is associated with a vector transformation applied by a different one of multiple quantum gates.

In yet still another example quantum AI prediction system of any preceding quantum AI prediction system, the gradient is determined using a set of overlap estimators for a set of coherent unitary circuits.

In still another example quantum AI system, the gradient is extracted using a quantum machine.

In still another example quantum AI system, maximizing the probability of overlap includes determining a parameter value for each one of a predefined number of simple or controlled single qubit quantum gates.

In still another example quantum AI prediction system, the probability of mean overlap is maximized using a stochastic gradient descent method.

In yet still another example quantum AI prediction system, the sequence of time-sequential data points represents a sequence of human decisions.

In still another example quantum AI prediction system, the sequence of time-sequential data points represents a sequence of human decisions.

An example method for training an AI quantum predictor comprises: receiving sequence of time-sequential data points; encoding a subset of consecutive data points in the sequence as an input vector; encoding a data point immediately following the subset within the sequence as a desired output vector; providing the input vector to a quantum prediction circuit defined by a parameters representable as a unitary matrix; based on the desired output vector and an actual output of the quantum prediction circuit, generating proposed adjusted parameters for the quantum prediction circuit; predicting a next data bit in the sequence using an updated version of the quantum prediction circuit constructed based on the proposed adjusted parameters.

In another example method of any preceding method, generating the proposed updated parameters for the quantum prediction circuit further comprises determining parameters of the quantum prediction circuit that maximize a probability of mean overlap between a quantum state generated by a current version of the quantum prediction circuit acting on the input vector and a quantum state of the output vector.

In yet still another example method of any preceding method, the method further comprises iteratively performing a sequence of steps comprising: encoding a second subset of the sequence of time-sequential data points as a new input vector; encoding a data point immediately following the second subset within the sequence as a new output vector; providing the new input vector to the quantum prediction circuit; estimating a gradient of a utility function with respect to circuit parameters; determining adjusted parameter values of the quantum prediction circuit using a provided learning rate; and updating the quantum prediction circuit based on the adjusted parameters In yet still another example method of any preceding method, the method further comprises evaluating performance of the quantum prediction circuit using a validation set applying the quantum prediction circuit for time-series prediction of future data points in the sequence responsive to determining that the performance satisfies predefined criteria. The validation set includes a third subset of the time-sequential sequence and a data point in the sequence immediately following the third subset within the time-sequential sequence.

In still another example method of any preceding method, determining the parameter values that maximize the probability over overlap further comprises: determining a gradient of a utility function with respect to an array of parameters $\theta_j$ where each index in the array is associated with a vector transformation applied by a different quantum gate of a predetermined number of quantum gates.

In yet still another example method of any preceding method, the method further comprises using a classical computer to update the parameters of the quantum prediction circuit based on the generated proposed adjusted parameters.

In yet another example method of any preceding method, the gradient is computed at least in part using a quantum machine.

In yet still another example method of any preceding method, maximizing the mean overlap includes determining a parameter value for each one of a predefined number of simple or controlled single qubit quantum gates.

In another example method of any preceding method, the sequence of time-sequential data points represents a sequence of human decisions.

An example system for training an AI quantum predictor comprises a quantum computer adapted to: prepare an input vector encoding a sequential subset of a time-sequential sequence; prepare a desired output vector encoding a data point in the time-sequential sequence immediately following a last data point of the subset; provide the input vector to a quantum prediction circuit defined by parameters representable as a unitary matrix; based on the desired output vector and an actual output of the quantum prediction circuit, generate proposed adjusted parameters of the quantum prediction circuit; and construct the quantum prediction circuit based on the adjusted parameters, the constructed circuit being usable to predict a next data bit in the time-sequential sequence.

In another example system according to any preceding system, the quantum computer generates proposed adjusted parameters of the quantum prediction circuit by determining parameters of the quantum prediction circuit that maximize a mean overlap between a quantum state generated by a current version of the quantum prediction circuit acting on a quantum state of the input qubit register and a quantum state of the output qubit register.

In still another example system according to any preceding system, the parameters of the quantum predictor circuit are classically adjusted using the proposed adjusted parameters output from the quantum computer.

An example system for training an AI quantum predictor comprises a means for preparing an input vector encoding a sequential subset of a time-sequential sequence; a means for preparing a desired output vector encoding a data point in the time-sequential sequence immediately following a last data point of the subset; a means for providing the input vector to a quantum prediction circuit defined by parameters representable as a unitary matrix; a means for generating generate proposed adjusted parameters of the quantum prediction circuit based on the desired output vector and an actual output of the quantum prediction circuit; and a means for constructing the quantum prediction circuit based on the adjusted parameters, the constructed circuit being usable to predict a next data bit in the time-sequential sequence.

Another example quantum AI prediction system disclosed herein comprises a means for receiving an input vector representing a subset of the time-sequential sequence; a means for encoding the input vector as a corresponding qubit register; a means for applying a trained quantum circuit to the qubit register; and a means for measuring one or more qubits output from the quantum prediction circuit to infer a next data point in the time-sequential sequence following the subset of the time-sequential sequence represented by the input vector.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A quantum AI prediction system for predicting data bits in a time-sequential sequence of data points comprising:
    a parameter optimizer stored in memory and executable to perform training operations for multiple input vectors representing different subsets of the time-sequential sequence, the training operations including:
    receiving an input vector representing a subset of the time-sequential sequence;
    encoding the input vector as a corresponding qubit register;
    applying a quantum prediction circuit to the qubit register, the quantum prediction circuit transforming the input vector based on a parameterized unitary matrix defining a set of parameters;
    determining a transformed input vector based on a measurement of one or more qubits output from the quantum prediction circuit;
    determining an adjustment to the set of parameters, the adjustment being effective to increase a probability of mean overlap between the transformed input vector and a desired output vector corresponding to a known next sequential data point in the time-sequential sequence;
    transmit an instruction to reconstruct the quantum prediction circuit based on the adjustment to the set of parameters; and
    in response to determining that outputs of the quantum prediction circuit satisfy predefined accuracy criteria over multiple iterations, transmit an instruction to construct a final version of the quantum prediction circuit.

2. The quantum AI prediction system of claim 1, wherein the quantum prediction circuit is trained, via the training operations, to maximize a probability of mean overlap between a quantum state generated by the parameterized unitary matrix acting on the input vector and a quantum state of the desired output vector, the desired output vector representing an encoded version of the known next sequential data point in the time-sequential sequence immediately following the data points of the encoded subset.

3. The quantum AI prediction system of claim 2, wherein maximizing the probability of mean overlap includes determining a gradient of a utility function with respect to an array of parameters $\theta_j$ where each index in the array is associated with a vector transformation applied by a different one of multiple quantum gates.

4. The quantum AI prediction system of claim 3, wherein the gradient is determined using a set of overlap estimators for a set of coherent unitary circuits.

5. The quantum AI prediction system of claim 3, wherein the gradient is extracted using a quantum machine.

6. The quantum AI prediction system of claim 2, wherein maximizing the probability of overlap includes determining a parameter value for each one of a predefined number of simple or controlled single qubit quantum gates.

7. The quantum AI prediction system of claim 2, wherein the probability of mean overlap is maximized using a stochastic gradient descent method.

8. The quantum AI prediction system of claim 1, wherein the sequence of time-sequential data points represents a sequence of human decisions.

9. A method for training an AI quantum predictor comprising:
    receiving sequence of time-sequential data points;
    performing training operations with respect to multiple subsets of the sequence of time-sequential data points, the training operations including:
    encoding a subset of the time-sequential data points in the sequence as an input vector;
    encoding the input vector as a corresponding qubit register;
    encoding a data point immediately following the subset within the sequence as a desired output vector;
    applying a quantum prediction circuit to the qubit register, the quantum prediction circuit defined by parameters representable as a unitary matrix;
    determining a transformed input vector based on a measurement of one or more qubits output from the quantum prediction circuit;
    determining an adjustment to the parameters that is effective to increase a probability of mean overlap between the transformed input vector and the desired output vector;

reconstructing the quantum prediction circuit based on the adjustment to the parameters; and in response to determining that outputs of the quantum prediction circuit satisfy predefined accuracy criteria over multiple iterations, constructing a final version of the quantum prediction circuit.

10. The method of claim 9, wherein determining the adjustment to the parameters further comprises:

determining parameters of the quantum prediction circuit that maximize a probability of mean overlap between a quantum state generated by a current version of the quantum prediction circuit acting on the input vector and a quantum state of the desired output vector.

11. The method of claim 10, wherein determining the parameters that maximize the probability mean overlap further comprises:

determining a gradient of a utility function with respect to an array of parameters $\theta_j$, where each index in the array is associated with a vector transformation applied by a different quantum gate of a predetermined number of quantum gates.

12. The method of claim 11, further comprising:

using a classical computer to update the parameters of the quantum prediction circuit based on the adjustment to the parameters.

13. The method of claim 11, wherein the gradient is computed at least in part using a quantum machine.

14. The method of claim 10, wherein maximizing the probability of mean overlap includes determining a parameter value for each one of a predefined number of simple or controlled single qubit quantum gates.

15. The method of claim 9, wherein determining the adjustment to the parameters further comprises:

estimating a gradient of a utility function with respect to the parameters;

determining adjusted parameter values of the quantum prediction circuit using a provided learning rate; and updating the quantum prediction circuit based on the adjusted parameters.

16. The method of claim 9, further comprising:

evaluating performance of the quantum prediction circuit using a validation set that includes a third subset of the time-sequential sequence and a data point in the sequence immediately following the third subset within the time-sequential sequence; and applying the quantum prediction circuit for time-series prediction of future data points in the sequence responsive to determining that the performance satisfies predefined criteria.

17. The method of claim 9, wherein the sequence of time-sequential data points represents a sequence of human decisions.

18. A system for training an AI quantum predictor comprising;

a quantum computer storing computer-executable instructions for performing training operations with respect to multiple input vectors representing different subsets of a time-sequential sequence, the training operations including:

prepare an input vector of the multiple input vectors, the input vector encoding a sequential subset of a time-sequential sequence;

encoding the input vector as a corresponding qubit register;

prepare a desired output vector encoding a data point in the time-sequential sequence immediately following a last data point of the subset;

apply a quantum prediction circuit to the qubit register, the quantum prediction circuit defined by parameters representable as a unitary matrix;

based on the desired output vector and an actual output of the quantum prediction circuit, generate proposed adjusted parameters of the quantum prediction circuit, the proposed adjusted parameters being effective to increase a probability of mean overlap between the input vector and the desired output vector;

reconstruct the quantum prediction circuit based on the adjustment to the parameters;

determine an accuracy metric for the quantum prediction circuit, the accuracy metric quantifying how accurate the quantum prediction circuit is at predicting a next data bit in the time-sequential sequence; and in response to determining that the accuracy metric satisfies predefined accuracy criteria, deploying the AI quantum predictor for time series prediction.

19. The system of claim 18, wherein the quantum computer generates proposed adjusted parameters of the quantum prediction circuit by:

determining parameters of the quantum prediction circuit that maximize a mean overlap between a quantum state generated by a current version of the quantum prediction circuit acting on the input vector the desired output vector.

20. The system of claim 18, wherein the parameters of the quantum predictor circuit are classically adjusted using the proposed adjusted parameters output from the quantum computer.

* * * * *